United States Patent
Kolor et al.

(10) Patent No.: US 12,401,605 B2
(45) Date of Patent: Aug. 26, 2025

(54) COMMUNICATION FABRIC STRUCTURES FOR INCREASED BANDWIDTH

(71) Applicant: Apple Inc., Cupertino, CA (US)

(72) Inventors: Sergio Kolor, Haifa (IL); Dan Darel, Tel Aviv (IL); Lior Zimet, Kerem Maharal (IL); Lital Levy-Rubin, Tel Aviv (IL); Opher Kahn, Zichron Yaakov (IL); Roi Uziel, Misgav (IL); Sagi Lahav, Haifa (IL); Shawn M. Fukami, Newark, CA (US); Tzach Zemer, Haifa (IL)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/433,184

(22) Filed: Feb. 5, 2024

(65) Prior Publication Data

US 2025/0097166 A1 Mar. 20, 2025

Related U.S. Application Data

(60) Provisional application No. 63/583,899, filed on Sep. 20, 2023.

(51) Int. Cl.
*H04L 49/25* (2022.01)
*H04L 49/00* (2022.01)

(52) U.S. Cl.
CPC .............. *H04L 49/25* (2013.01); *H04L 49/30* (2013.01)

(58) Field of Classification Search
CPC .................................. H04L 49/25; H04L 49/30
See application file for complete search history.

(56) References Cited

U.S. PATENT DOCUMENTS

| | | | |
|---|---|---|---|
| 6,973,079 B1 * | 12/2005 | Carlson | H04L 49/30 370/395.71 |
| 7,437,518 B2 | 10/2008 | Tsien | |
| 7,529,245 B1 * | 5/2009 | Muller | H04L 69/324 370/395.7 |
| 9,119,109 B1 | 8/2015 | Dubrovsky et al. | |
| 2008/0232364 A1 | 9/2008 | Beverly | |

(Continued)

OTHER PUBLICATIONS

International Search Report and Written Opinion in PCT Appl. No. PCT/US2024/043732 mailed Dec. 2, 2024, 13 pages.

*Primary Examiner* — Wutchung Chu
(74) *Attorney, Agent, or Firm* — Kowert, Hood, Munyon, Rankin & Goetzel, P.C.; Scott W. Pape; Dean M. Munyon

(57) ABSTRACT

An apparatus includes first agents configured to transfer transactions using an ordered protocol, as well as second agents configured to transfer transactions using a protocol with no enforced ordering. The apparatus may also include input/output (I/O) interfaces coupled to respective ones of the first agents and configured to enforce the ordered protocol. The apparatus may further include a communication network including a plurality of network switches. A particular one of the network switches may be coupled to at least one other network switch of the plurality. The apparatus may also include a network interface coupled to the second agents, to the I/O interfaces, and to the particular network switch. This network interface may be configured to transfer data transactions between the second agents and the particular network switch, and to transfer data transactions between the I/O interfaces and the particular network switch.

20 Claims, 13 Drawing Sheets

(56) References Cited

U.S. PATENT DOCUMENTS

| | | |
|---|---|---|
| 2009/0070775 A1* | 3/2009 | Riley .................. H04L 49/65 |
| | | 719/321 |
| 2013/0166812 A1* | 6/2013 | Boucard .............. G06F 13/405 |
| | | 710/314 |
| 2014/0114928 A1 | 4/2014 | Beers et al. |
| 2014/0365632 A1 | 12/2014 | Ishii et al. |
| 2015/0006749 A1 | 1/2015 | Hendel et al. |
| 2016/0065484 A1* | 3/2016 | Suzuki ................ H04L 47/623 |
| | | 370/415 |
| 2018/0331960 A1* | 11/2018 | Browne .............. H04L 47/2441 |
| 2019/0312772 A1* | 10/2019 | Zhao .................... H04L 41/12 |
| 2020/0213217 A1* | 7/2020 | Nye ...................... G06N 3/084 |
| 2022/0232111 A1* | 7/2022 | Ford ................... H04L 49/9036 |
| 2022/0311544 A1 | 9/2022 | Alverson et al. |
| 2023/0053530 A1 | 2/2023 | Hammarlund et al. |

\* cited by examiner

1200

Receiving, by a network interface circuit, a first plurality of data transactions from the particular network switching circuit via a plurality of input channels, wherein the data transactions are received at a first data rate per input channel.
1210

Sending, by the network interface circuit, the first plurality of data transactions to an agent circuit coupled to the network interface circuit using a second data rate that is higher than the first data rate.
1220

Receiving, by the network interface circuit, a second plurality of data transactions from the agent circuit using the second data rate.
1230

Sending, by the network interface circuit, the second plurality of data transactions to the particular network switching circuit via one or more output channels, wherein a first number of the input channels is greater than a second number of the one or more output channels..
1240

FIG. 12

COMMUNICATION FABRIC STRUCTURES FOR INCREASED BANDWIDTH

The present application claims priority from U.S. Provisional App. No. 63/583,899, entitled "Communication Fabric Structures for Increased Bandwidth," filed Sep. 20, 2023, the disclosure of which is incorporated by reference herein in its entirety.

BACKGROUND

Technical Field

Embodiments described herein are related to computing systems including, for example, systems-on-a-chip (SoCs). More particularly, embodiments are disclosed relating to techniques for increasing bandwidth through a communication fabric.

Description of the Related Art

A network fabric interconnect may provide high bandwidth and low latency transport layers between various agents coupled across a plurality of networks in an integrated circuit or multichip system. Such interconnect architectures may be designed to have various specialized lanes for transporting data between each of the various agents, for example, central processing units (CPUs), graphic processing units (GPUs), neural processing engines, memory systems and the like. To support a unified memory space, a high bandwidth network fabric may employ network switches that are fully buffered. Various types of peripheral circuits (e.g., "agents") may be included in these systems and may employ a variety of communication protocols. These agents may be coupled to ones of the network switches via one or more forms of networking interfaces.

In some systems, a communication fabric may include each agent being connected to one of several network interfaces which, in turn, may be coupled to the communication fabric. Such a technique may have a high communication latency, multiple protocol conversions, a high-level of data buffering, and a high-level of power consumption. In addition, a protocol with ordering rules may be applied for agents that do not require an ordered protocol, thereby further reducing performance in some cases.

BRIEF DESCRIPTION OF THE DRAWINGS

The following detailed description makes reference to the accompanying drawings, which are now briefly described.

FIG. 12 shows a flow diagram of an embodiment of a method for transferring data transactions using a network interface with asymmetrical input and output channels.

Figure 1:
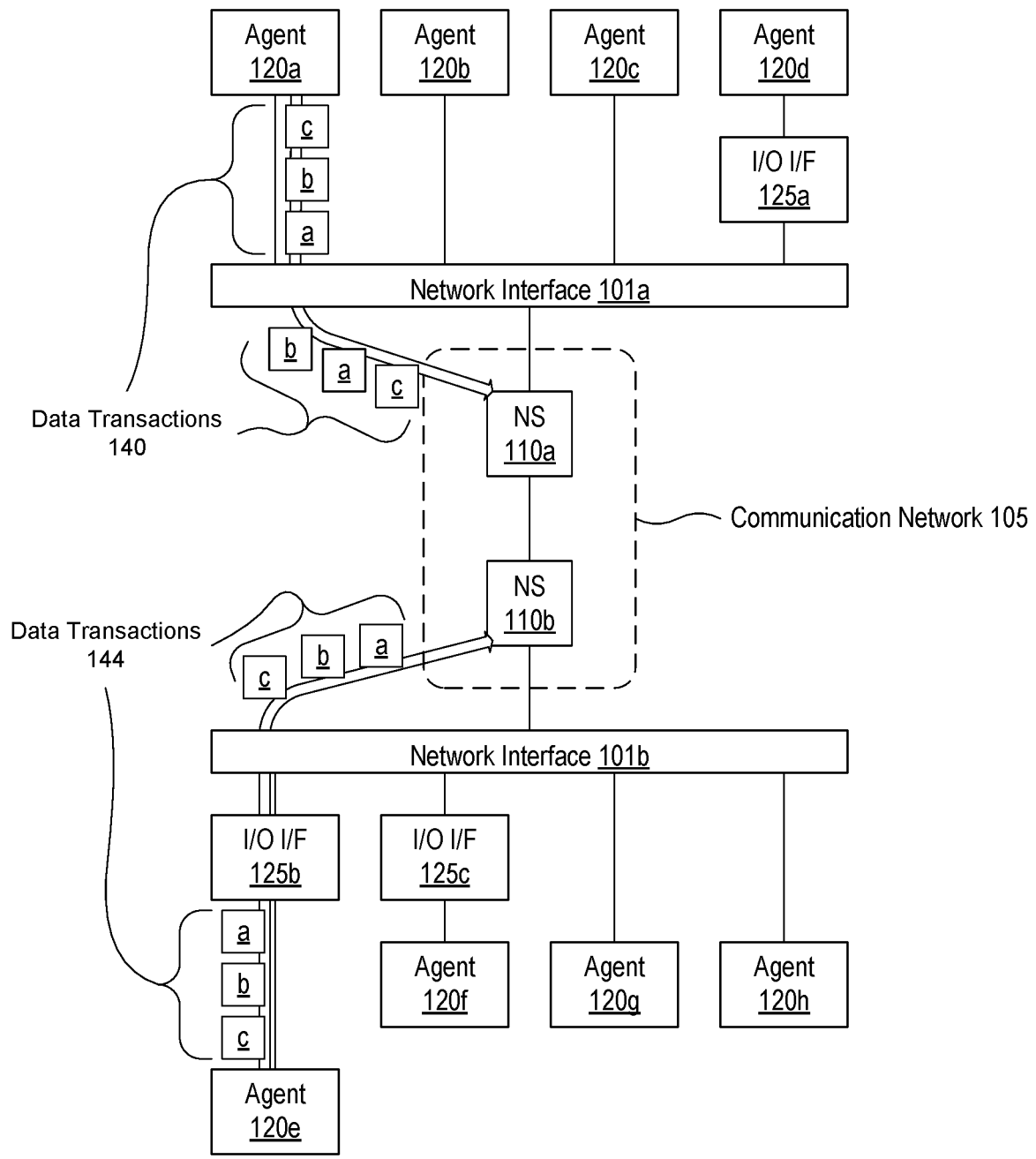
FIG. 1 illustrates a block diagram of an embodiment of a system that includes a communication network coupled to a plurality of agent circuits via network interfaces and input/output (I/O) interfaces.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims.

DETAILED DESCRIPTION OF EMBODIMENTS

Various integrated circuits and multichip systems may employ a plurality of communication networks. As used herein, "communication network," or simply "network," refers collectively to various agents that communicate, via a common set of network switches. Such networks may be physically independent (e.g., having dedicated wires and other circuitry that form the network) and logically independent (e.g., communications sourced by agents in the system may be logically defined to be transmitted on a selected network of the plurality of networks and may not be impacted by transmission on other networks). In some embodiments, network switches may be included to transmit packets on a given network. As used herein, an "agent" refers to a functional circuit that is capable of initiating (sourcing) or being a destination for communications on a network. An agent may generally be any circuit (e.g., CPU, GPU, neural processing engine, peripheral, memory controller, etc.) that may source and/or receive communications on a given network. A source agent generates (sources) a communication, and a destination agent receives the communication. A given agent may be a source agent for some communications and a destination agent for other communications. In some cases, communication between two agents (also referred to as a "transaction") may cross between two or more of the networks.

By providing physically and logically independent networks, high bandwidth may be achieved via parallel communication on the different networks. Additionally, different traffic may be transmitted on different networks, and thus a given network may be optimized for a given type of traffic.

For example, a multicore CPU in an system may be sensitive to memory latency and may cache data that is expected to be coherent among the cores and memory. Accordingly, a CPU network may be provided on which the cores and the memory controllers in a system are agents. Another network may be an input/output (I/O) network. This I/O network may be used by various peripheral devices ("peripherals") to communicate with memory. The network may support the bandwidth needed by the peripherals and may also support cache coherency. Furthermore, the system may additionally include a relaxed order network. The relaxed order network may be non-coherent and may not enforce as many ordering constraints as an I/O or a CPU network. The relaxed order network may be used by GPUs to communicate with memory controllers. Other embodiments may employ any subset of the above networks and/or any additional networks, as desired.

This combination of networks in a system may be referred to as a "communication fabric," a "network fabric," or simply a "fabric." In some instances, a "global fabric" may be used to refer to the various communication paths that are "woven" across all networks in a system. A "local fabric," therefore, may refer to communication paths "woven" across a subset of networks and or portions of a network. As described above, a communication fabric may include a number of agents being connected to a network interface which, in turn, may be coupled to the communication fabric. In some embodiments, a group of agents may be coupled to an input/output (I/O) interface that resides between the network interface and the group of agents.

Use of an I/O interface between agents and network interfaces may allow for use of intellectual property (IP) circuit designs from variety of IP providers by accommodating multiple data formats and communication protocols. An I/O interface may support translations from one or more data formats to a data format supported by the network interface. In addition, such an I/O interface may support an ordered transaction protocol in which transactions are sent to the network interface in an order in which they are received from an agent. Any responses to an ordered set of transactions may also be returned to the source agent in an order in which the source agent sent the transactions.

Use of an I/O interface between agents and network interfaces may also result in high communication latency, multiple protocol conversions, a high-level of data buffering, thereby resulting in a high-level of power consumption. In addition, application of ordering rules may be applied for agents that do not require an ordered protocol, thereby further reducing performance in some cases. Accordingly, a reduced I/O interface is proposed for use with peripheral agents that require ordered protocols. A multiport network interface is also proposed to communicate directly with a plurality of peripheral agents that do not require use of ordered protocols.

Another novel communication fabric technique, disclosed herein, includes a physical network topology that places source agents in one general area of an integrated circuit (IC) while destination agents may be physically arranged in other areas of the IC. Two or more communication lanes may be utilized in a particular network to couple the source and destination agents. At least some of the network switches coupled to the source agents may be cross-coupled between communication lanes to enable communication across the lanes. Network switches coupled to the destination agents may be coupled only to network switches in a same lane.

A further novel communication fabric technique involves use of network interfaces with more input channels than output channels. Such network interfaces may allow for transactions to be buffered in an input channel of the network interface, thereby removing the transactions from network switches, allowing for an increased number of transactions to be routed by the network switches of a given network.

For the ease of discussion, various embodiments in this disclosure are described as being implemented using one or more SoCs. It is to be understood that any disclosed SoC can also be implemented using a chiplet-based architecture. Accordingly, wherever the term "SoC" appears in this disclosure, those references are intended to also suggest embodiments in which the same functionality is implemented via a less monolithic architecture, such as via multiple chiplets, which may be included in a single package in some embodiments.

On a related note, some embodiments are described herein that include more than one SoC. Such architectures are to be understood to encompass both homogeneous designs (in which each SoC includes identical or almost identical functionality) and heterogeneous designs (in which the functionality of each SoC diverges more considerably). Such disclosure also contemplates embodiments in which the functionalities of the multiple SoCs are implemented using different levels of discreteness. For example, the functionality of a first system could be implemented on a single IC, while the functionality of a second system (which could be the same or different than the first system) could be implemented using a number of co-packaged chiplets.

FIG. 1 illustrates a block diagram of an embodiment of a system that uses I/O interfaces in combination with network interfaces. System 100 includes a plurality of agent circuits 120a-120h (collectively 120). A portion of agent circuits 120 are coupled directly to one of two network interfaces 101a and 101b (collectively 101), while the remaining agent circuits 120 are coupled to one of network interfaces 101 via a respective one of I/O interfaces (I/O I/F) 125a-125c (collectively 125). Network interfaces 101 are coupled to a communication network that includes network switching circuits (NS) 110a and 110b. Network interfaces 101 in combination with communication network 105 support transfer of data transactions 140 and 144 from respective ones of agent circuits 120. System 100 may be, in whole or in part, a computing system, such as a desktop or laptop computer, a smartphone, a tablet computer, a wearable smart device, or the like. In some embodiments, system 100 is a single IC, such as a system-on-chip, or a multi-die chip.

As shown, a first group of agent circuits (120d, 120e, and 120f) are configured to transfer data transactions, including data transactions 144, using an ordered protocol, such as a peripheral component interconnect (PCI) protocol. Such ordered protocols may specify that data transactions are transferred in an order in which they are sent from a respective agent circuit. A second group of agent circuits (120a-120c and 120g-120h) are, in contrast, configured to transfer data transactions using a protocol with no enforced ordering. To support the ordered protocol for the first group of agent circuits, input/output (I/O) interfaces 125a, 125b, and 125c are coupled to respectively to agent circuits 120d, 120e, and 120f, and are configured to enforce the ordered protocol for the data transactions sent by the first group of agent circuits, including data transactions 144.

Communication network 105 includes network switching circuits 110a and 110b. As illustrated, network switching circuit 110a is coupled to at least network switching circuit 110b, and each may be further coupled to one or more additional network switching circuits in communication network 105.

Network interface 101a, as shown, is coupled to agent circuits 120a-120c, to I/O interface 125a, and to network switching circuit 110a. Network interface 101a may be configured to transfer data transactions (including data transactions 140) between agent circuits 120a-120c and network switching circuit 110a, as well as transfer data transactions between I/O interface 125a and network switching circuit 110a. Similarly, network interface 101b is coupled agent circuits 120g and 120h, to I/O interfaces 125b and 125c, and to network switching circuit 110b. Network interface 101b may be configured to transfer data transactions between agent circuits 120g and 120h and network switching circuit 110a, as well as transfer data transactions (including data transactions 144) between I/O interfaces 125b and 125c and network switching circuit 110a.

As illustrated, agent circuit 120a transfers data transactions 140 to network interface 101a in a first order: data transaction 140a, followed by data transaction 140b, and then data transaction 140c. Since network interface 101a is not required to enforce an ordered protocol, data transactions 140 may be sent to network switching circuit 110a in any suitable order. For example, each of data transactions 140 may be directed to a different destination agent circuit, such as different memory circuits. Accordingly, network interface 101a may send the data transactions 140 as resources are available to receive a given transaction. Each of the memory circuits may include a respective request queue and may not be available to receive a given transaction until an entry in the respective request queue is available. Accordingly, data transactions 140 may be sent in a different order than they were received. As shown, network interface sends data transaction 140c first, 140a second and 140b third. In other cases, data transactions may be reordered based on their respective transaction type. For example, data transactions 140a and 140b may be write requests for a given memory circuit, while data transaction 140c is a read request for the same memory circuit. A read request may have a higher priority than a write request and, in some cases, may also be fulfilled faster than a write request. Network interface 101a may reorder data transactions 140 for a variety of reasons, some of which may increase bandwidth for communication network 105, and/or reduce power consumed by communication network 105 and/or destination agent circuits.

Agent circuit 120e, as shown, transfers data transactions 144 to I/O interface 125b in a first order: data transaction 144a, followed by data transaction 144b, and then data transaction 144c. I/O interface 125b is configured to follow the same order for data transactions 144. In some embodiments, I/O interface 125b may forward each of data transactions 144 to network interface 101b, one at a time, waiting for an acknowledgement or other form of response before sending a subsequent one of data transactions 144. For example, I/O interface 125b may send data transaction 144a to network interface 101b and wait for a response to be sent via network interface 101b before sending data transaction 144b. In such a manner, the ordered processing of data transactions 144 may be ensured but may also be slow compared to other techniques. In other embodiments, I/O interface 125b may transfer data transactions 144 to network interface 101b in the received order. Network interface 101b, however, may not enforce the same order and may forward data transactions 144 in a different order. I/O interface 125b, however, may then receive responses associated with data transactions 144 and buffer the received responses until a response to the first transaction, data transaction 144a, is received, which may then be forwarded to agent circuit 120e. I/O interface 125b may continue buffering responses until a response to data transaction 144b is received, and so on. In such a manner, I/O interface 125b may process transactions, from the view of agent circuit 120e, in the original order.

It is noted that system 100, as illustrated in FIG. 1, is merely an example. System 100 has been simplified to highlight features relevant to this disclosure. Elements not used to describe the details of the disclosed concepts have been omitted. For example, system 100 may include various circuits that are not illustrated, such as one or more memory circuits, clock generator circuits, power management circuits, and the like. Only one communication network is illustrated. In other embodiments, a communication fabric with any suitable number of networks may be included. In various embodiments, circuits of system 100 may be implemented using any suitable combination of sequential and combinatorial logic circuits. In addition, register and/or memory circuits, such as static random-access memory (SRAM) may be used in these circuits to temporarily hold information such as instructions, data, address values, and the like.

In FIG. 1, a communication network utilizing network interfaces and I/O interfaces is disclosed. Such network interfaces and I/O interfaces may perform additional processing not disclosed in the description of FIG. 1. An example of translating between different data formats is depicted in FIG. 2.

Figure 2:
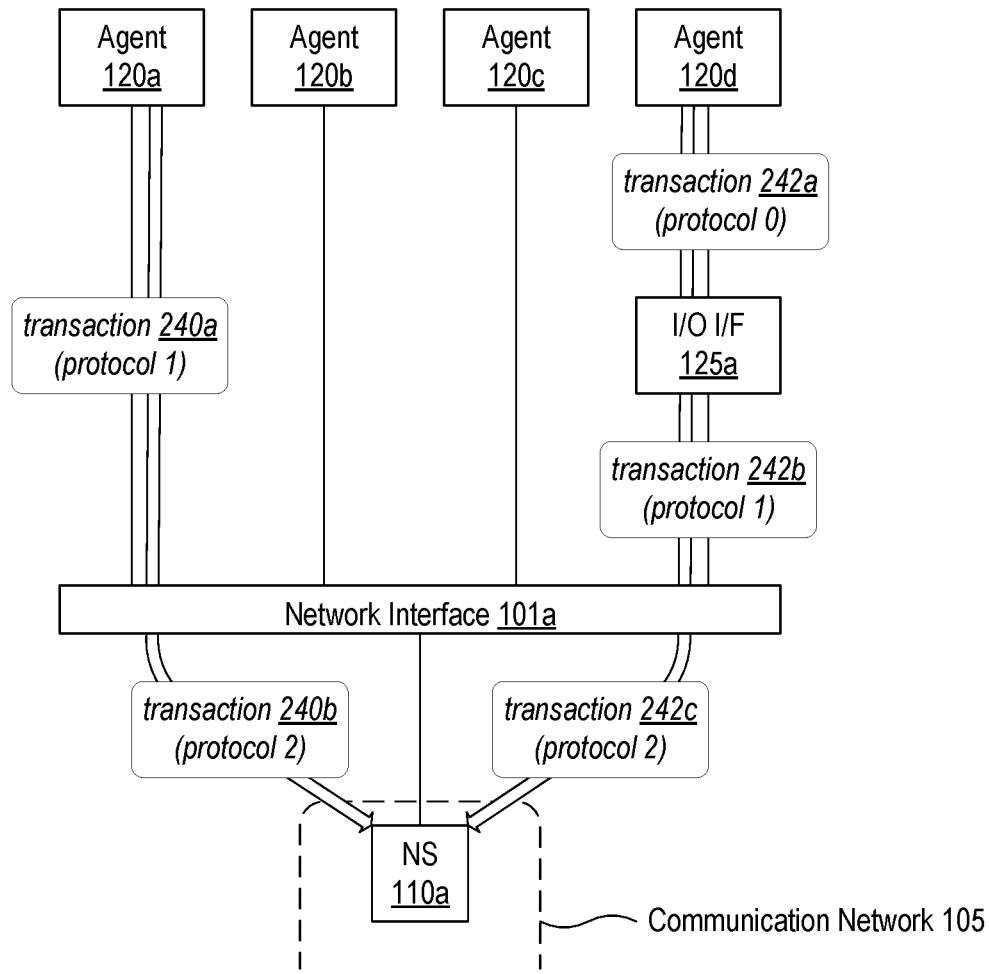
FIG. 2 shows a block diagram of a portion of an embodiment of the system of FIG. 1 in which a plurality of protocols is used.

Moving to FIG. 2, a portion of the block diagram of system 100 of FIG. 1 is shown. Illustrated in FIG. 2 are agents 120a-120d, network interface 101a, network switching circuit 110a, and I/O interface 125a. This portion of system 100 is used to depict how data formats of transactions may be modified as they progress from a source agent to the communication network.

As illustrated, agent circuit 120d is configured to send data transaction 242a to I/O interface 125a using a first protocol (protocol 0). Agent circuit 120a is configured to send data transaction 240a to network interface 101a using a second protocol (protocol 1), that is different than protocol 0. In various embodiments, different protocols may include different data formats as well as different rules for sending and receiving data packets. Protocol 1, for example, may specify a data packet with a destination address in a first bit field, a packet size in a second bit field, a source/owner process identifier in a third bit field and then one or more data words as specified by the packet size. Rules for sending and receiving packets using protocol 1 may include receiving an acknowledgement from the destination agent as well as one or more rules governing packet priority versus other transactions using the same protocol. Protocol 0 may specify similar information in data packets, but the bit fields may be arranged in a different order. In addition, protocol 0 may specify an ordered processing of transactions and, therefore, may include a packet number in an additional bit field usable to determine this order.

I/O interface 125a, as shown, is configured to send data transaction 242a received from agent circuit 120d to network interface 101a using protocol 1. Since network interface 101a is coupled to multiple different agents, circuit designers may desire to simplify a design of network interface 101 to support a limited number of protocols. If a particular agent circuit, e.g., agent circuit 120d, does not support one of the limited number of protocols, then a respective I/O interface such as I/O interface 125a may be included between agent circuits without support for the limited protocols (e.g., agent circuit 120d) and network interface 101a.

Accordingly, I/O interface 125a is configured to translate data transaction 242a from protocol 0 to protocol 1, thereby generating data transaction 242b. Such a translation may include rearranging data in various bit fields of protocol 0 into corresponding bit fields of protocol 1, removing extraneous information not included in protocol 1, adding information required by protocol 1 that is not supported in protocol 0, and the like. I/O interface 125a sends data transaction 242b to network interface 101a after the translation.

Network interface 101a may, in turn, be configured to translate received data transactions 240a and 242b into a third protocol (protocol 2) that is supported by network switching circuit 110a, as well as other network switching circuits in communication network 105. Accordingly, these translations of data transactions 240a and 242b into protocol 2 may generate transactions 240b and 242c, respectively. Like the translation from protocol 0 to protocol 1, the translation from protocol 1 to protocol 2 may include various combinations of rearranging, adding, and removing data among a plurality of bit fields in a data packet.

Although transactions are illustrated as moving from agent circuits 120a and 120d to communication network 105, the opposite may also be implemented. Accordingly, network interface 101a may be configured to translate transactions coming from network switching circuit 110a from protocol 2 to protocol 1 prior to sending to any of agent circuits 120a-120c or I/O interface 125a. Likewise, I/O interface 125a may translate transactions received from network interface 101a from protocol 1 to protocol 0 prior to sending the transactions to agent circuit 120d.

It is noted that the system of FIG. 2 is simplified for clarity. In other embodiments, any suitable number of agent circuits, I/O interfaces, network interfaces network switching circuits and the like may be included in other embodiments. Although network interface 101a is described as translating between protocols 1 and 2, other network interfaces may translate between other protocols. For example, network interface 101b in FIG. 1 may use a fourth protocol for data packets sent to and from agent circuits g and h and/or I/O interfaces 125b and 125c.

Figure 3:
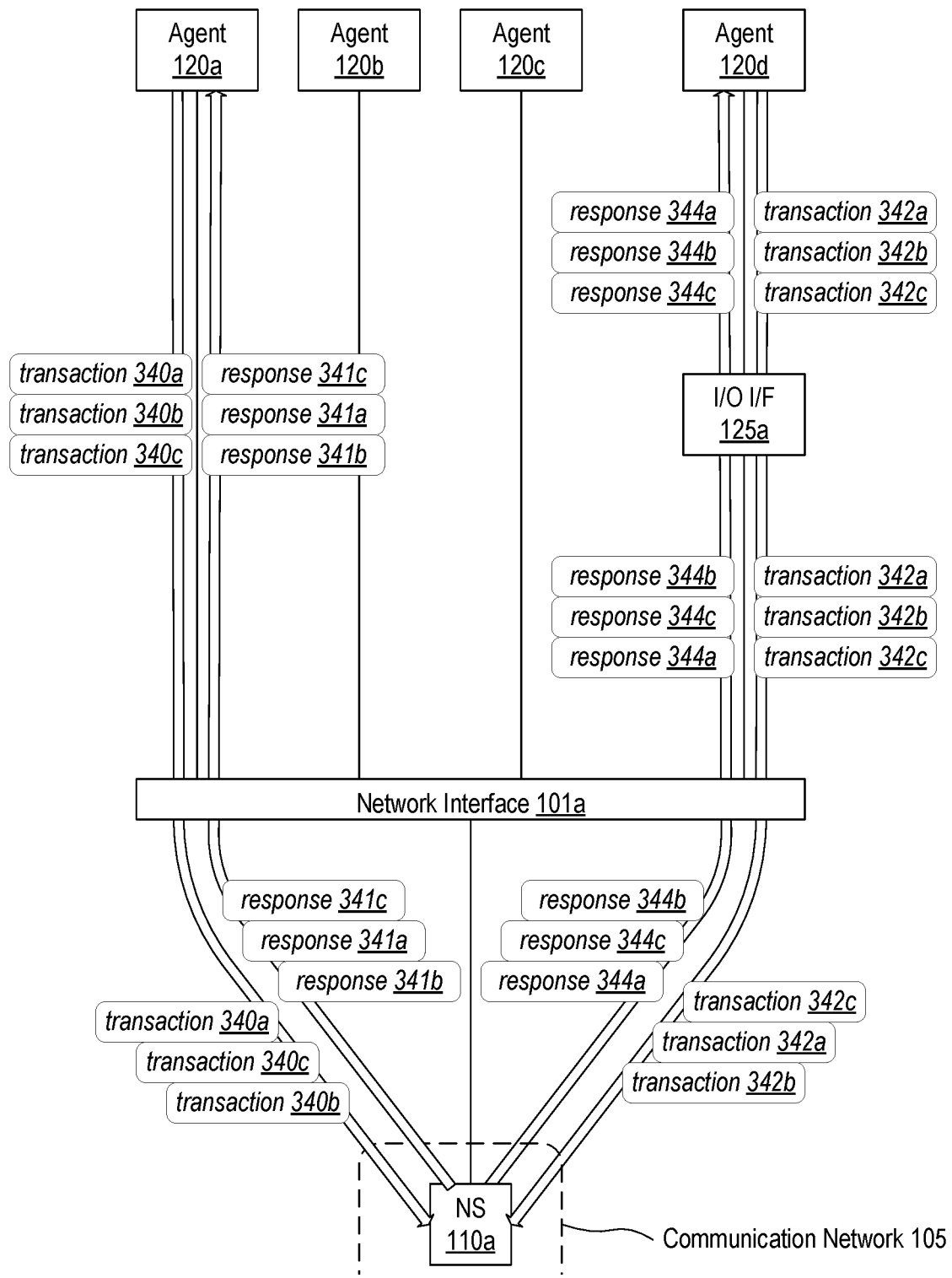
FIG. 3 depicts a block diagram of a portion of an embodiment of the system of FIG. 1 in which an ordered protocol is enforced for some agent circuits.

FIG. 2 depicts how different protocols may be handled for different agent circuits. In the description of FIG. 1, protocols that enforce an ordered processing of transactions were disclosed. FIG. 3 depicts such an embodiment.

Continuing to FIG. 3, a same portion of the block diagram of system 100 of FIG. 1 is illustrated. Depicted in FIG. 3 are agents 120a-120d, network interface 101a, network switching circuit 110a, and I/O interface 125a. This portion of system 100 is used to depict how an order of transactions may be adjusted as they progress from a source agent to the communication network via an I/O interface.

As illustrated, agent circuit 120d is configured to send, in a first order, a series of data transactions (transactions 342a-342c) to I/O interface 125a. Agent circuit 120d may be configured to send and receive data transactions 342a-342c in a particular order. For example, agent circuit 120d may be configured to utilize a PCI protocol in which data transactions are expected to be processed in a same order as they are sent. The PCI protocol may also expect acknowledgements or other types of responses associated with sent data transactions. As illustrated, agent circuit 120d sends transaction 342a, followed by transaction 342b, and then transaction 342c. This is referred to herein as the original order.

I/O interface 125a, as shown, is configured to send data transactions 342a-342c to network interface 101a in the first order, e.g., 342a, 342b, and then 342c. I/O interface 125a, in some embodiments, may be configured to use the same original order to send data transactions 342a-342c to network interface 101a. Network interface 101a, however, may be configured to send data transactions 342a-342c to communication network 105 in a second order, different than the first, original order. For example, one or more of data transactions 342a-342c may be directed to a different destination agent than the other transactions. One of these different destination agents may have a full request queue and not be able to receive new transactions for a period of time, while other ones of the destination agents may have available resources and therefore be able to receive new transactions. Network interface 101a may, therefore, send transaction 342c first due to the associated destination agent being available to receive transactions, while transactions 342a and 342b are delayed due to unavailable resources for their respective destination agents.

Network interface 101a may use other criteria as well to determine an order for sending data transactions 342a-342c. For example, each of data transactions 342a-342c may have a respective priority assigned, such bulk transaction or real time transaction. A bulk transaction may correspond to a standard or lowest priority for data transactions, while a real time transaction may correspond to a high priority in which the transaction needs to be processed with a minimal amount of latency. In some embodiments, agent circuit 120d may include a plurality of processor cores, each processor core capable of executing a different software process. Priorities may be associated with these different processes and, in turn, be assigned to ones of the transactions issued by the respective process.

As illustrated, network interface 101a receives, from network switching circuit 110a, responses to each of data transactions 342a-342c in a third order that is different from the original or second orders. As depicted, response 344b, corresponding to transaction 342b, is received first, followed by response 344c (corresponding to transaction 342c) and then response 344a (corresponding to transaction 342a). The response may be received in the third order due to relative amounts of time each of the destination agents takes to receive and process the transactions. In addition, network traffic between network switching circuit 110a and network switching circuits coupled to each of the destination agents may delay sending the transactions as well as receiving the responses. If a given destination agent is at a far end of communication network 105, then transactions and responses may travel through tens, or even hundreds, of network switching circuits.

Network interface 101a, as shown, is configured to send responses 344a-344c to I/O interface 125a in the received third order. For example, network interface 101a may forward each response as it is received. I/O interface 125a, on the other hand, is configured to send responses 344a-344c to agent circuit 120d in the original first order. To send responses 344a-344c to agent circuit 120d in the original order, I/O interface 125a is configured to buffer one or more of responses 344a-344c as they are received from network interface 101a in the third order. I/O interface 125a, for example, may include a buffer circuit capable of storing multiple responses. Accordingly, I/O interface 125a may buffer response 344b and response 344c until response 344a has been received. After response 344a is received, it is forwarded to agent circuit 120d, followed by response 344b and then response 344c. Agent circuit 120d, therefore, receives responses 344a-344c in the original order, and I/O interface complies with the ordered protocol even though network interface 101a does not comply with the ordered protocol.

Agent circuit 120a, as depicted, is configured to send a series of data transactions (transactions 340a-340c) to network interface 101a, in a given order. Transaction 340a is first, followed by transaction 340b, and then transaction 340c last. Network interface 101a may use one or more of the criteria described above to determine an order for sending data transactions 340a-340c to network switching circuit 110a. As shown, the order is transaction 340a first, transaction 340c second, and transaction 340b third.

Responses to these transactions are received at a later point in time, in another order. Responses 341a-341c are received in the order, response 341c first, response 341a second and response 341b third. As agent circuit 120a does not enforce an ordered protocol, network interface 101a may forward the responses to agent circuit 120a in the same order in which they are received.

It is noted that the embodiment of FIG. 3 is merely an example. A limited number of elements are shown to illustrate the disclosed concepts. In other embodiments, any suitable number of each element may be included in other embodiments. Although I/O interface 125a is described as maintaining the original order, in some embodiments, I/O interface 125a may reorder transactions from agent circuit 120d, for example, moving a real time transaction in front of one or more bulk transactions. I/O interface 125a may, in some embodiments, still send responses to agent circuit 120d in the original order.

Figure 4:
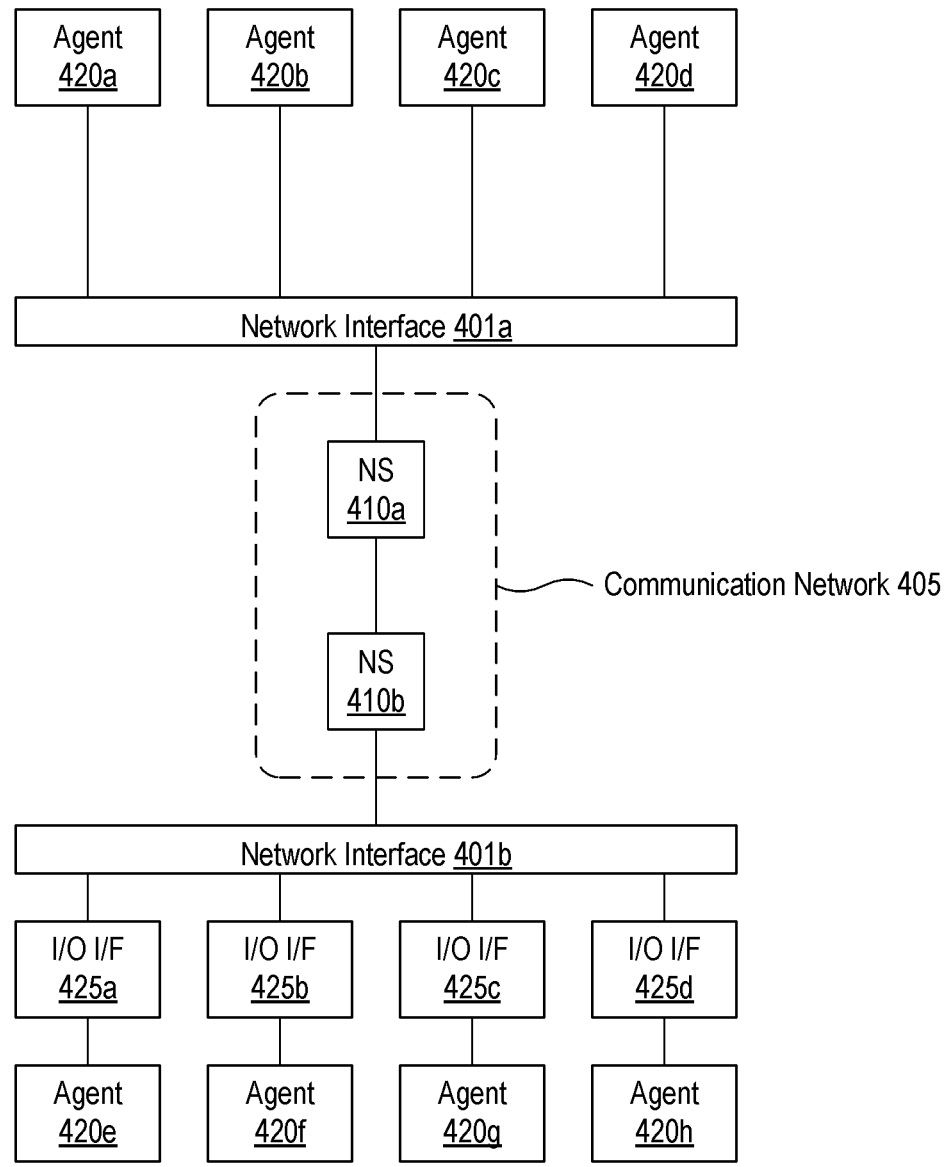
FIG. 4 illustrates a block diagram of another embodiment of a system that includes a communication network coupled to a plurality of agent circuits via network interfaces and I/O interfaces.

In system 100 of FIGS. 1-3, network interface circuits are shown coupled to a mix of agent circuits with and without I/O interface circuits. In some embodiments, particular groups of agent circuits may be coupled to a same network interface circuit. FIG. 4 illustrates such an embodiment.

Proceeding to FIG. 4, a block diagram of an embodiment of a system that groups particular sets of agent circuits with common network interface circuits. System 400 includes agent circuits 420a-420h (collectively 420). Agent circuits 420a-420d are coupled directly to network interface 401a, while agent circuits 420e-420h are coupled to network interface 401b via respective ones of I/O interfaces (I/O I/F) 425a-425d (collectively 425). Network interfaces 401a and 401b are coupled to communication network 405 via network switching circuits (NS) 410a and 410b, respectively. In a similar manner as system 100, system 400 may be included, in whole or in part, in a computing system, such as a desktop or laptop computer, a smartphone, a tablet computer, a wearable smart device, or the like. In some embodiments, system 400 is a single IC, such as a system-on-chip, or is a multi-die chip.

System 400 illustrates a different arrangement of agent circuits to network interfaces. As illustrated, agent circuits 420e-420h may be configured to transfer data transactions using an ordered protocol such as described above. Accordingly, I/O interfaces 425a-425d are coupled to respective ones of agent circuits 420e-420h, as well as to network interface 401b. I/O interfaces 425a-425d are configured to enforce the ordered protocol when agent circuits 420e-420h send and receive transactions and/or responses via network interface 401b. Network interface 401b is further coupled to network switching circuit 410b.

In a manner as previously disclosed, any of agent circuits 420e-420h may send transactions in a first order, using a first protocol, and respective ones of I/O interfaces 425a-425d may translate the transactions into a second protocol, and forward the translated transactions to network interface 401b in the first order. Network interface 401b may then translate the transactions from the second protocol to a third protocol, and may reorder the transaction prior to transferring them to other network switching circuits to respective destination agents. Received responses to these transactions may be forwarded to the respective I/O interfaces 425a-425d as they are received, regardless of the original order of the transactions. I/O interfaces 425a-425d, however, may buffer received responses that do not confirm to the first order. These responses may be forwarded to the respective agent circuit 420e-420h when a response to a first transaction in the first order is received.

Network interface 401a, in contrast, is coupled directly to agent circuits 420a-420d and to network switching circuit 410a. As described above, any of agent circuits 420a-420d may send transactions in a first order, using the second protocol, and network interface 401a may translate the transactions from the second protocol to the third protocol, and may reorder the transactions prior to transferring them to other network switching circuits to respective destination agents. Received responses to these transactions may be forwarded to the respective agent circuit 420a-420d as they are received, regardless of the original order of the transactions.

By grouping agent circuits with common attributes to a common network interface, a given network interface may be optimized for the common attributes. Respective ones of the I/O interface circuits, however, may still be used for each agent circuit that follows an ordered protocol. This may allow a single or a few I/O interface circuit designs to be created and reused across a plurality of IC designs. The individual I/O interface circuits may also support scalability as more or fewer agent circuits that follow the ordered protocol may be used in various IC designs.

It is noted that system 400, as illustrated in FIG. 4, is merely an example to demonstrate disclosed techniques. System 400 has been simplified to highlight features relevant to this disclosure. Although a single communication network is illustrated, a communication fabric with any suitable number of networks may be included in other embodiments. As described for system 100, circuits of system 400 may be implemented using any suitable combination of sequential and combinatorial logic circuits, as well as register and/or memory circuits.

The circuits and techniques described above in regards to FIGS. 1-4 may be performed using a variety of methods. Two methods associated with transferring transactions via a communication network are described below in regard to FIGS. 5-6.

Figure 5:
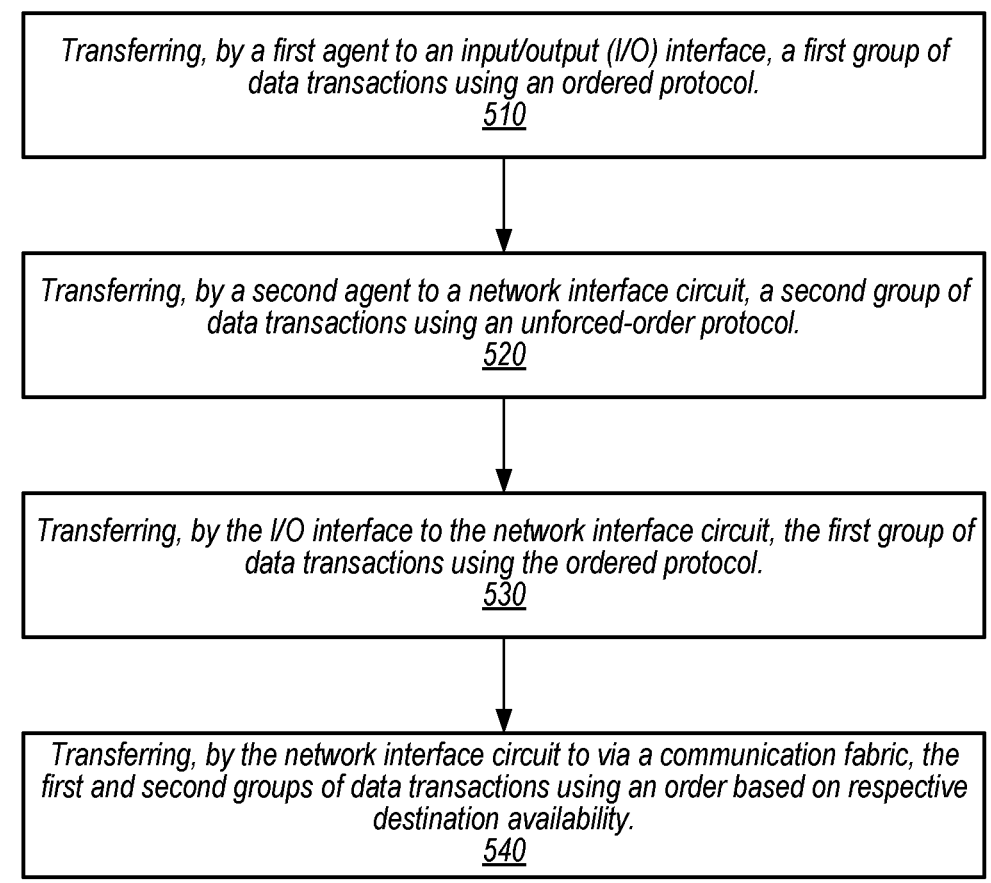
FIG. 5 shows a flow diagram of an embodiment of a method for transferring data transactions using network interfaces and I/O interfaces.

Turning now to FIG. 5, a flow diagram for an embodiment of a method for transferring transactions issued by two different agent circuits is illustrated. Method 500 may be performed by any of the systems disclosed herein, such as systems 100 and 400 of FIGS. 1-4. Method 500 is described below using system 100 of FIG. 1 as an example. References to elements in FIG. 1 are included as non-limiting examples.

At 510, method 500 begins by transferring, by a first agent to an I/O interface, a first group of data transactions using an ordered protocol. For example, agent circuit 120e may send data transactions 144 to I/O interface 125b in a first order. Agent circuit 120e may be configured to expect data transactions 144 to be processed in the first order which, as shown, corresponds to data transaction 144a first, data transaction 144b second, and data transaction 144c third.

Enforcement of the first order may include expecting responses corresponding to data transactions 144 to follow the first order.

Method 500 continues at 520 by transferring, by a second agent to a network interface circuit, a second group of data transactions using an unforced-order protocol. For example, agent circuit 120a may send data transactions 140 to network interface 101a in a first order corresponding to data transaction 140a first, data transaction 140b second, and data transaction 140c third. Agent circuit 120a, unlike agent circuit 120e, may be configured to allow processing of data transactions 140 occur in any suitable order. Responses to ones of data transactions 140 may be received by agent circuit 120a in any order.

At 530 method 500 proceeds with transferring, by the I/O interface to the network interface circuit, the first group of data transactions using the ordered protocol. As shown in FIG. 1, I/O interface 125b may forward data transactions 144 to network interface 101b using the first order. In some embodiments, I/O interface 125b may delay sending a subsequent one of data transactions 144 until a previously sent transaction 144 has been forwarded by network interface 101b. Such a technique may enable I/O interface 125b to enforce the first order. In other embodiments, I/O interface 125b may not delay between transfers of data transactions 144, which may allow network interface 101b to reorder the data transactions 144.

Method 500 proceeds at 540 with transferring, by the network interface circuit to via a communication fabric, the first and second groups of data transactions using an order based on respective destination availability. Network interfaces 101a and 101b may determine availability of destination agents for each of data transactions 140 and 144, respectively. Network interfaces 101a and 101b may further determine relative priorities between respective ones of data transactions 140 and 144. Using such availability and priority information, network interface 101a may determine to transfer data transaction 140c before data transactions 140a and 140b. In some cases, network interface 101b may determine that the first order may be maintained and, therefore, may transfer data transactions 144 using the first order. In other embodiments, network interface 101b may reorder data transactions 144 due to, e.g., availability of resources of one or more of the destination agents.

Use of I/O interfaces with agent circuits that enforce ordered transactions may allow enforcement to be limited to only agent circuits that require ordered processing of transactions. Other solutions may place the enforcement of ordered transactions in network interfaces that are coupled to pluralities of agent circuits, some of which may not confirm to an ordered protocol. Forcing ordered processing onto agent circuits that do not confirm to such protocols may increase latencies for these agent circuits to complete transactions, thereby potentially reducing a performance bandwidth of the system.

It is noted that the method of FIG. 5 includes blocks 510-540. Method 500 may end in block 540 or may repeat some or all blocks of the method. For example, method 500 may repeat blocks 510 and/or 520 repeatedly to transfer additional transactions. In some embodiments, different instances of method 500 may be performed concurrently in system 100. For example, agent circuit 120a and network interface 101b may perform portions of one instance of method 500 while agent circuit 120e, I/O interface 125b, and network interface 101b perform portions of a different instance of method 500.

Figure 6:
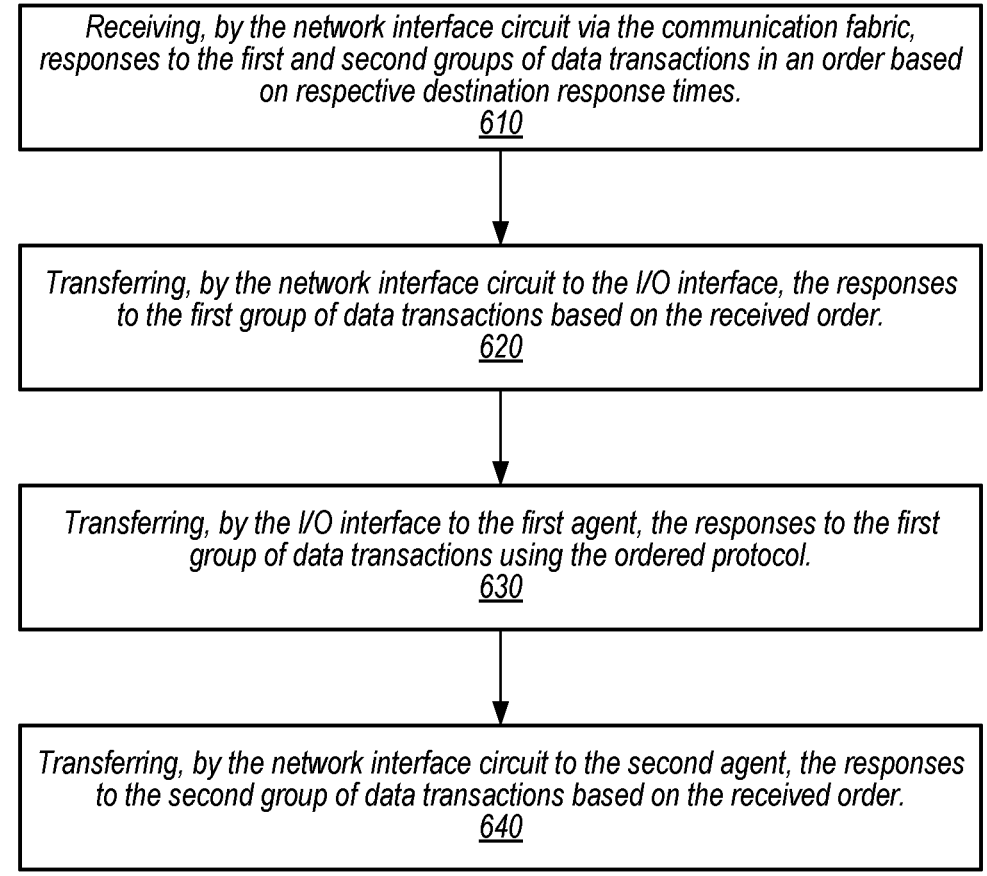
FIG. 6 shows a flow diagram of an embodiment of a method for transferring responses to data transactions using network interfaces and I/O interfaces.

Proceeding now to FIG. 6, a flow diagram for an embodiment of a method for receiving responses to previously issued transactions issued by an agent circuit that uses an ordered protocol is illustrated. Like method 500, method 600 may be performed by any of the systems disclosed herein including, for example, systems 100 and 400 of FIGS. 1-4. Method 600 is described below using system 100 of FIG. 3 as an example. References to elements in FIG. 3 are included as non-limiting examples. Operations of method 600 may occur after an instance of method 500 has been performed.

Method 600 begins in 610 by receiving, by the network interface circuit via the communication fabric, responses to first and second groups of data transactions in an order based on respective destination response times. As shown in FIG. 3, for example, agent circuit 120a issues data transactions 340a-340c and agent circuit 120d issues data transactions 342a-342c. Each agent circuit sends their respective transactions in the order a-b-c. As these transactions are forwarded to their respective destination agents, the transactions may be reordered. At a later point in time, network interface 101a receives responses to each of the issued transactions. Network interface 101a receives responses 341a-341c in the order c-a-b, and receives responses 344a-344c in the order b-c-a.

At 620, method 600 proceeds by transferring, by the network interface circuit to the I/O interface, the responses to the first group of data transactions based on the received order. For example, network interface 101a sends responses 344a-344c to I/O interface 125a in the received order, e.g., b-c-a.

Method 600 continues at 630 with transferring, by the I/O interface to the first agent, the responses to the first group of data transactions using the ordered protocol. As depicted in FIG. 3, I/O interface 125a forwards responses 344a-344c to agent circuit 120d in the original order, e.g., a-b-c. To accomplish this, I/O interface 125a may buffer responses 344b and 344c until response 344a is received. After response 344a is received, it may be forwarded to agent circuit 120d, followed by response 344b and then response 344c, thus presenting responses 344a-344c to agent circuit 120d in the original issued order.

At 640, method 600 proceeds with transferring, by the network interface circuit to the second agent, the responses to the second group of data transactions based on the received order. As described above, agent circuit 120a may not be configured to enforce an ordered protocol. Accordingly, network interface 101a may forward the responses to agent circuit 120a in the same order in which they are received, e.g., response 341c first, response 341a second, and response 341b third.

It is noted that method 600 includes blocks 610-640. Method 600 may end in block 640 or may repeat some or all blocks of the method. For example, method 600 may return to block 610 to receive additional responses to other previously issued transactions. Various instances of methods 500 and 600 may be performed concurrently.

In FIGS. 1-6, systems and techniques are disclosed for using I/O interfaces in communication networks that include a plurality of agent circuits, some of which may enforce ordered protocols and some of which may not. Other techniques may be implemented for increasing bandwidth in a communication network. One such technique is disclosed in FIGS. 7-10.

Figure 7:
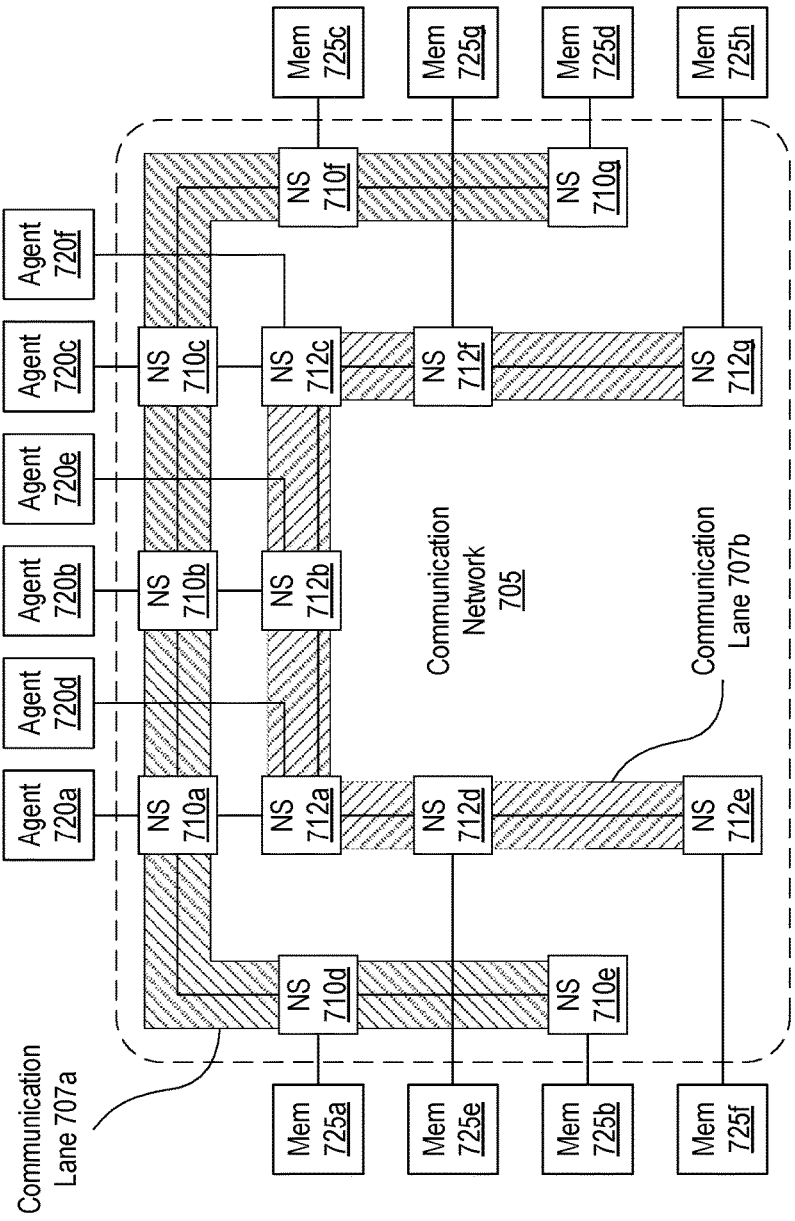
FIG. 7 depicts a block diagram of an embodiment of a system with a communication network with multiple communication lanes.

Moving to FIG. 7, a block diagram of an embodiment of a system that includes a multi-lane communication network is depicted. As illustrated, system 700 includes two sets of network switching circuits. Network switching circuits 710a-710g are included in communication lane 707a. Network switching circuits 712a-712g are included in communication lane 707b. System 700 further includes a plurality of agent circuits 720a-720f and a plurality of memory circuits 725a-725h. Communication lanes 707a and 707b are included in communication network 705. In a similar manner as described for system 100 in FIG. 1, system 700 may be, in whole or in part, a laptop or desktop computer, a smartphone, a tablet computer, a wearable smart device, or the like. In some embodiments, system 700 may be a single IC, such as a system-on-chip, or may be a multi-die chip.

As illustrated, agent circuits 720a-720f may be configured to initiate memory transactions, as well as to receive memory transactions. Agent circuits 720a-720f may be any circuit (e.g., CPU, GPU, neural processing engine, peripheral, memory controller, etc.) that may source and/or receive communications on communication network 705. Memory circuits 725a-725h may be configured to respond to memory transactions from agent circuits 720a-720f. For example, memory circuits 725a-725h may include any suitable combinations of volatile and non-volatile memory cells including, for example, static random-access memory (SRAM), dynamic random-access memory (DRAM), flash memory, a hard drive, register files, and the like. Given ones of memory circuits 725a-725h may be configured to process a given memory transaction based on an address accessed by the given memory transaction, including read transactions to access values stored in the given memory circuits 725a-725h and write transactions to store values supplied by respective ones of agent circuits 720a-720f.

Communication network 705, as shown, includes network switching circuits 710a-710c coupled to agent circuits 720a-720c, respectively, and network switching circuits 712a-712c coupled to agent circuits 720a-720c, respectively. Communication network 705 also includes network switching circuits 710d-710g coupled to memory circuits 725a-725d and network switching circuits 712d-712g coupled to memory circuits 725e-725h. Communication network 705 is configured to transfer memory transactions via communication lanes 707a and 707b.

As depicted, communication lane 707a includes network switching circuits 710a-710g and is therefore coupled to a proper subset of agent circuits 720a-720f, e.g., agent circuits 720a-720c, as well as to a proper subset of memory circuits 725a-725h, e.g., memory circuits 725a-725d. In a similar manner, communication lane 707b includes network switching circuits 712a-712g and is therefore coupled to the proper subset of agent circuits 720d-720f, as well as to the proper subset of memory circuits 725e-725h. It is noted that the proper subsets of agent circuits and memory circuits are mutually exclusive between communication lanes 707a and 707b.

Network switching circuits 710a-710c in communication lane 707a are coupled to respective ones of network switching circuits 712a-712c in communication lane 707b. In some embodiments, network switching circuits 710a-710c and network switching circuits 712a-712c may be coupled to form a mesh sub-network between communication lanes 707a and 707b. In contrast, network switching circuits 710d-710g in communication lane 707a are isolated from network switching circuits 712a-712g in communication lane 707b. Similarly, network switching circuits 712d-712g in communication lane 707b are isolated from network switching circuits 710a-710g in communication lane 707a. As used herein, "isolated from" refers to a lack of a direct link from the isolated network switching circuits in one communication lane to network switching circuits in a different communication lane, and vice versa.

In some embodiments, agent circuits 720a-720f may be physically located in one particular region of an IC die, such as at one end of the die. Accordingly, network switching circuits 710a-710c and 712a-712c may be placed in the same region. In addition, these network switching circuits 710a-710c and 712a-712c may be coupled to form a mesh network, enabling transfer of transactions between any group of agent circuits 720a-720f. A close physical proximity between these agent circuits may reduce latency of communications between the agent circuits. In some cases, agent circuits 720a-720f may frequently communicate among one another and, therefore, reducing latency (as compared to having agent circuits spread farther from one another across the IC die) may improve performance of system 700.

Memory circuits 725a-725h may, in contrast, not communicate between one another. Instead, memory circuits 725a-725h may more frequently communicate with various ones of agent circuits 720a-720f. Accordingly, memory circuits 725a-725h may be placed farther from one another across other regions of the IC die. Use of the multiple communication lanes, including communication lanes 707a and 707b, may help to mitigate traffic congestion if multiple agent circuits 720a-720f are accessing respective ones of memory circuits 725a-725h. Use of communication lanes 707a and 707b may help to distribute memory transactions across different sets of network switching circuits 710a-710g and 712a-712g, thereby reducing latency due to multiple transactions having to pass through common ones of network switching circuits 710a-710g and 712a-712g.

Despite the division of communication network 705 into communication lanes 707a and 707b, any of agent circuits 720a-720f may be capable of sending and receiving memory transactions to any of memory circuits 725a-725h. For example, agent circuit 720b, coupled to network switching circuit 710b in communication lane 707a, may be configured to initiate a particular memory transaction for memory circuit 725h coupled to network switching circuit 712g in communication lane 707b. To send the memory transaction, agent circuit 720b may transfer the particular memory transaction to network switching circuit 710b. Network switching circuit 710b, in turn, may be configured to transmit the particular memory transaction to network switching circuit 712b in communication lane 707b. As illustrated, network switching circuit 710b may be configured to transmit the particular memory transaction directly to network switching circuit 712b without using an intermediate network switching circuit.

Network switching circuit 712b may be configured to transmit the particular memory transaction to network switching circuit 712g in communication lane 707b. To access memory circuit 725h, network switching circuit 712b may be further configured to send the particular memory transaction via one or more intermediate network switching circuits in communication lane 707b (e.g., network switching circuits 712c and 712f in the illustrated example.

It is noted that system 700, as shown in FIG. 7, is merely an example. Like system 100 in FIG. 1, system 700 has been simplified to highlight features relevant to this disclosure and omit elements that are not relevant. For example, system 700 may include various circuits that are not illustrated, such as clock generator circuits, power management circuits, and the like. Although the disclosed communication lanes are described as being included in one communication network, in other embodiments, a communication fabric with any suitable number of networks may be included. The circuits of system 700 may be implemented using any suitable combination of sequential and combinatorial logic circuits. Memory circuits may be implemented suitable types of memory cells, such as SRAM, DRAM, flash, and the like.

In FIG. 7, a single communication network, e.g., on a single IC die is disclosed. Some systems may implement a multi-die solution, each die including at least one respective communication network. An example of a multi-die embodiment is depicted in FIG. 8.

Figure 8:
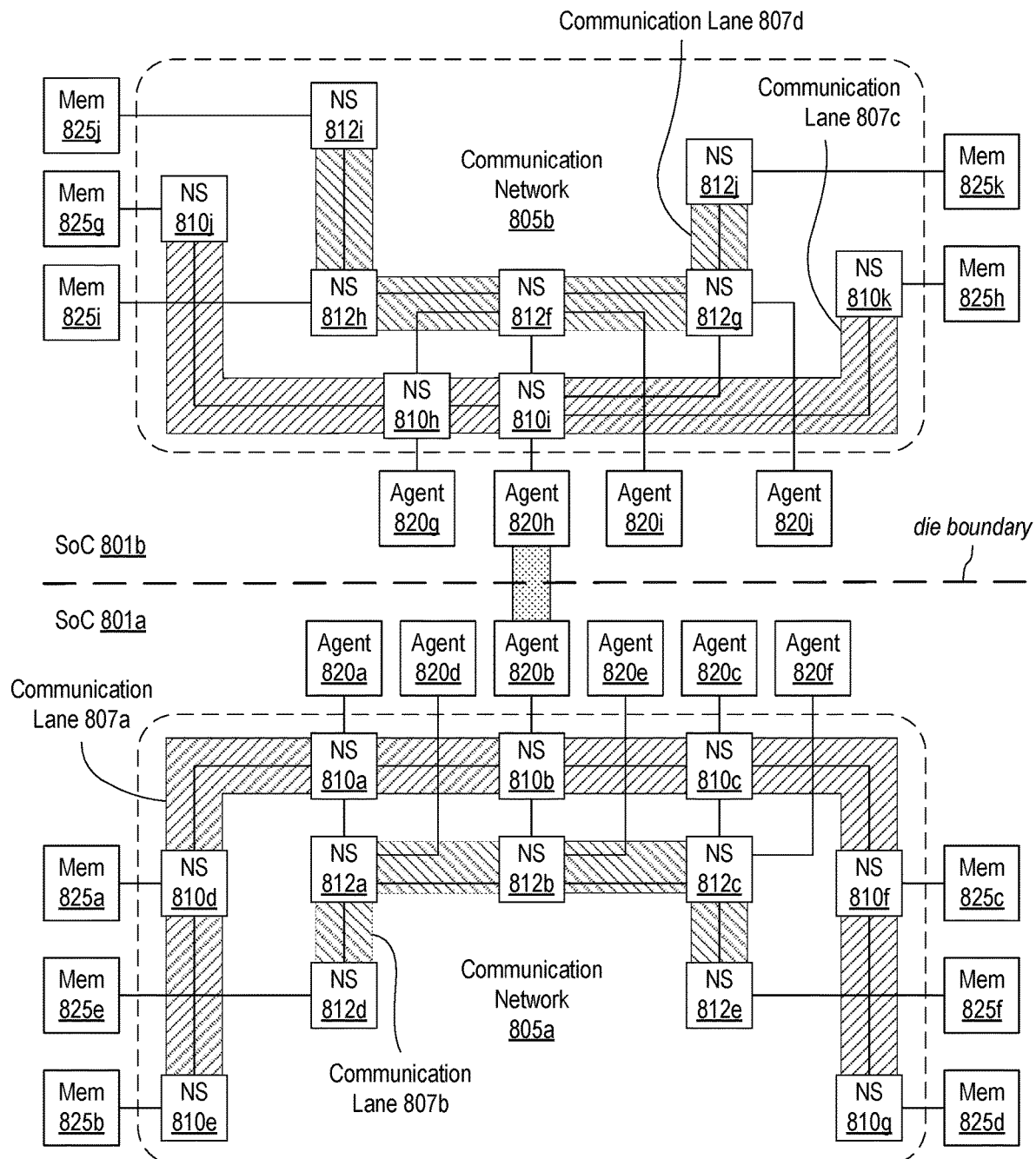
FIG. 8 illustrates a block diagram of an embodiment of a system with two SoCs, each with a communication network with multiple communication lanes.

Moving to FIG. 8, a block diagram of an embodiment of a system that includes two IC dies, each including a respective multi-lane communication network is illustrated. As shown, system 800 includes SoCs 801*a* and 801*b*. In various embodiments, SoCs 801*a* and 801*b* may be packaged separately and coupled together via a circuit board, coupled together within a common package, or coupled together via any other suitable manner. SoC 801*a* includes network switching circuits 810*a*-810*g* and 812*a*-812*e*, agent circuits 820*a*-820*f* and memory circuits 825*a*-825*f*. Communication lanes 807*a* and 807*b* are included in communication network 805*a*. SoC 801*b* includes network switching circuits 810*h*-810*k* and 812*f*-812*j*, agent circuits 820*g*-820*j* and memory circuits 825*g*-825*k*. Communication lanes 807*c* and 807*d* are included in communication network 805*b*. In a similar manner as described in regards to, for example, system 700 in FIG. 7, system 800 may be included in a laptop or desktop computer, a smartphone, a tablet computer, a wearable smart device, or the like.

As illustrated, SoC 801*b* includes agent circuit 820*h* which is a die-to-die interface circuit. In addition, agent circuit 820*b* in SoC 801*a* includes a die-to-die interface circuit configured to transfer memory transactions between SoCs 801*a* and 801*b*. The die-to-die interfaces in agent circuits 820*b* and 820*h* may enable SoCs 801*a* and 801*b* to communicate and process transactions such that an operating system executed on SoC 801*a* and/or 801*b* may perform as if system 800 were a single IC.

For example, agent circuit 820*b* is coupled to network switching circuit 810*b* in communication lane 807*a* of SoC 801*a*. Agent circuit 820*f* is coupled to network switching circuit 812*c* in communication lane 807*b* and may be configured to initiate a particular memory transaction for memory circuit 825*j* in SoC 801*b*. To transfer the particular memory transaction to memory circuit 825*j*, agent circuit 820*f* may be configured to send the particular memory transaction to network switching circuit 810*c* which, in turn, may be configured to transfer the particular memory transaction to network switching circuit 810*b* via either network switching circuit 810*c* or 812*b*, both of which are coupled to network switching circuit 810*b*.

Network switching circuit 810*b* may, as illustrated, be configured to transfer the particular memory transaction to agent circuit 820*b*. Using the die-to-die interfaces, agent circuit 820*b* transfers the particular memory transaction to agent circuit 820*h* in SoC 801*b*. Agent circuit 820*h* may be configured to transfer the particular memory transaction network switching circuit 812*i* via network switching circuits 810*i*, 812*f*, and 812*h*. The particular memory transaction may then be delivered to memory circuit 825*j* via network switching circuit 812*j*.

Use of multiple communication lanes may enable SoCs 801*a* and 801*b* to be coupled to one another via a single die-to-die interface on each SoC. Use of the multiple communication lanes may help to avoid traffic congestion once transactions have crossed over the die-to-die interface into the destination SoC. Furthermore, agent circuits 820*a*-820*j* may, as described for system 700 in FIG. 7, be physically placed in respective regions of each SoC, near the respective die-to-die interface. Such placement may help to reduce transaction latency from source agent circuits to the die-to-die interfaces.

It is noted that that the system of FIG. 8, is an example for demonstrating the disclosed techniques. System 800 has been simplified to show elements relevant to this demonstration. Although one communication network is shown for each SoC, in other embodiments, a communication fabric with any suitable number of networks may be included.

Figure 9:
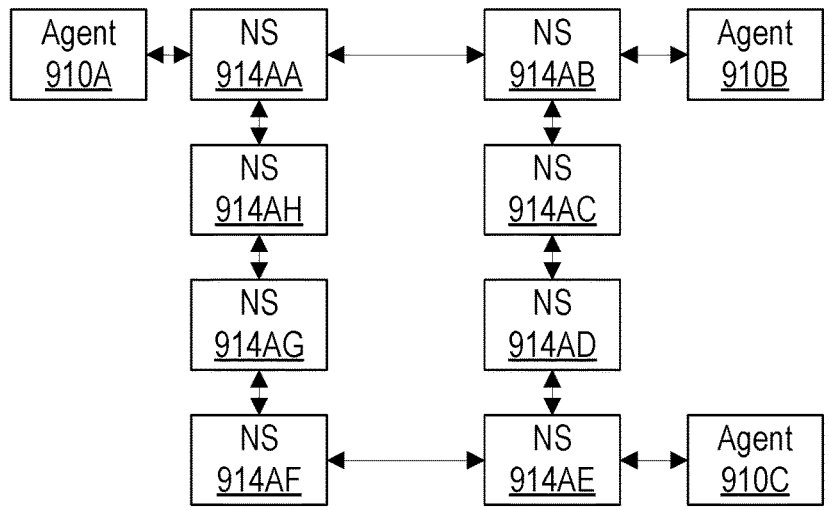
FIG. 9 shows a block diagram of an embodiment of a network with a ring topology.
Figure 10:
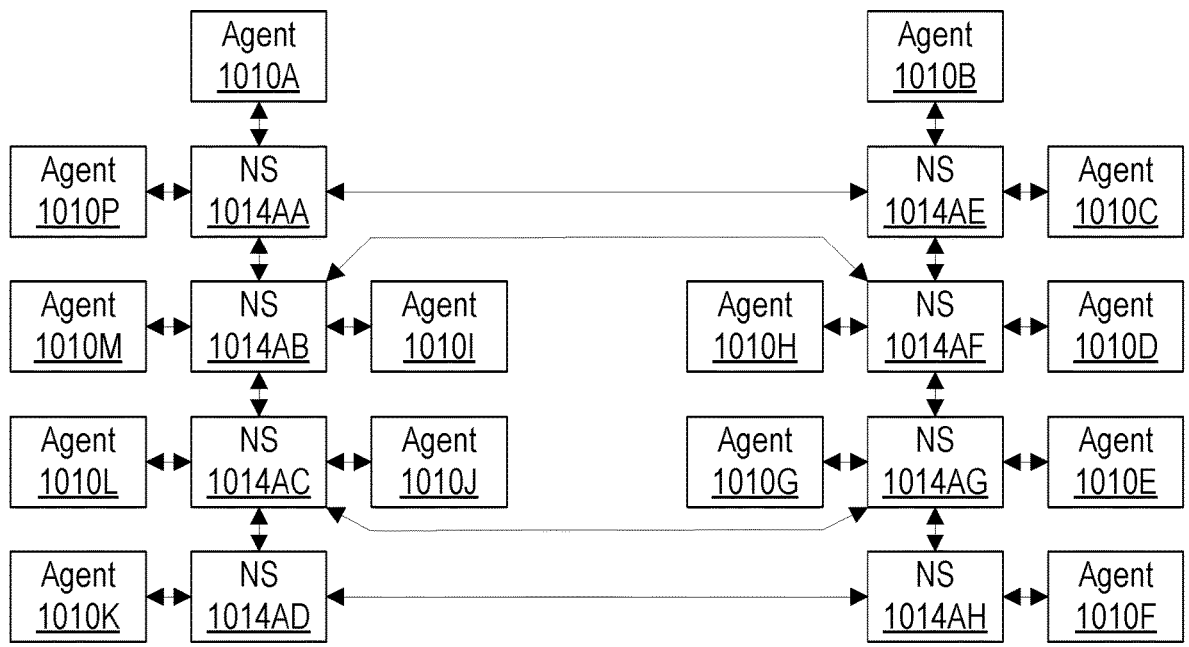
FIG. 10 depicts a block diagram of an embodiment of a network with a mesh topology.

In FIGS. 1-8, various embodiments of a communication network are disclosed. These communications networks may be a single network or a network fabric that includes a plurality of networks. Whether a single network or a fabric of networks, each network may be implemented using any suitable type of network topology, with a given network fabric including networks of varying structure. FIGS. 9 and 10 illustrate two examples of network topologies.

Turning to FIG. 9, a block diagram of an embodiment of a network using a ring topology to couple a plurality of agent circuits is shown. In the example of FIG. 9, the ring is formed from network switching circuits 914AA-914AH. Agent circuit 910A is coupled to network switching circuit 914AA; agent circuit 910B is coupled to network switching circuit 914AB; and agent circuit 910C is coupled to network switching circuit 914AE.

As shown, a "network switching circuit," or simply "network switch" is a circuit that is configured to receive communications on a network and forward the communications on the network in the direction of the destination of the communication. For example, a communication sourced by a processor may be transmitted to a memory controller that controls the memory that is mapped to the address of the communication. At each network switch, the communication may be transmitted forward toward the memory controller. If the communication is a read, the memory controller may communicate the data back to the source and each network switching circuit may forward the data on the network toward the source. In an embodiment, the network may support a plurality of virtual channels. The network switching circuit may employ resources dedicated to each virtual channel (e.g., buffers) so that communications on the virtual channels may remain logically independent. The network switching circuit may also employ arbitration circuitry to select among buffered communications to forward on the network. Virtual channels may be channels that physically share a network, but which are logically independent on the network (e.g., communications in one virtual channel do not block progress of communications on another virtual channel).

In a ring topology, each network switching circuit 914AA-914AH may be connected to two other network switching circuits 914AA-914AH, and the switches form a ring such that any network switching circuit 914AA-914AH may reach any other network switching circuit in the ring by transmitting a communication on the ring in the direction of the other network switch. A given communication may pass through one or more intermediate network switching circuits in the ring to reach the targeted network switching circuit. When a given network switching circuit 914AA-914AH receives a communication from an adjacent network switching circuit 914AA-914AH on the ring, the given network switching circuit may examine the communication to determine if an agent circuit 910A-910C to which the given network switching circuit is coupled is the destination of the communication. If so, the given network switching circuit may terminate the communication and forward the communication to the agent. If not, the given network switching circuit may forward the communication to the next network switching circuit on the ring (e.g., the other network switching circuit 914AA-914AH that is adjacent to the given network switching circuit and is not the adjacent network switching circuit from which the given network switching circuit received the communication). As used herein, an "adjacent network switch" to a given network switching circuit may be a network switching circuit to which the given network switching circuit may directly transmit a communication, without the communication traveling through any intermediate network switching circuits.

The example of FIG. 9 is one example of a ring network topology. As illustrated, any pair of adjacent network switching circuits may communicate in both directions, as indicated by the arrows. In some embodiments, however, a ring network may allow communication in only one direction, e.g., only clockwise or only counterclockwise. Such embodiments may be used, for example, to simplify design of each of the network switching circuits.

Proceeding to FIG. 10, a block diagram of one embodiment of a network using a mesh topology to couple agent circuits 1010A-1010P is illustrated. As shown in FIG. 10, network 1000 may include network switching circuits 1014AA-1014AH. Network switching circuits 1014AA-1014AH are coupled to two or more other network switching circuits. For example, network switching circuit 1014AA is coupled to network switching circuits 1014AB and 1014AE; network switching circuit 1014AB is coupled to network switching circuits 1014AA, 1014AF, and 1014AC; etc. as illustrated in FIG. 10. Thus, individual network switching circuits in a mesh network may be coupled to a different number of other network switching circuits. Furthermore, while network 1000 has a relatively symmetrical structure, other mesh networks may be asymmetrical, for example, depending on the various traffic patterns that are expected to be prevalent on the network. At each network switching circuit 1014AA-1014AH, one or more attributes of a received communication may be used to determine the adjacent network switching circuit 1014AA-1014AH to which the receiving network switching circuit 1014AA-1014AH will transmit the communication (unless an agent circuit 1010A-1010P to which the receiving network switching circuit 1014AA-1014AH is coupled is the destination of the communication, in which case the receiving network switching circuit 1014AA-1014AH may terminate the communication on network 1000 and provide it to the destination agent circuit 1010A-1010P). For example, in an embodiment, network switching circuits 1014AA-1014AH may be programmed at system initialization to route communications based on various attributes.

In an embodiment, communications may be routed based on the destination agent. The routings may be configured to transport the communications through the fewest number of network switching circuits (the 37 shortest path) between the source and destination agent that may be supported in the mesh topology. Alternatively, different communications for a given source agent to a given destination agent may take different paths through the mesh. For example, latency-sensitive communications may be transmitted over a shorter path while less critical communications may take a different path to avoid consuming bandwidth on the short path, where the different path may be less heavily loaded during use, for example. Additionally, a path may change between two particular network switching circuits for different communications at different times. For example, one or more intermediate network switching circuits in a first path used to transmit a first communication may experience heavy traffic volume when a second communication is sent at a later time. To avoid delays that may result from the heavy traffic, the second communication may be routed via a second path that avoids the heavy traffic.

FIG. 10 may be an example of a partially-connected mesh: at least some communications may pass through one or more intermediate network switching circuits in the mesh. A fully-connected mesh may have a connection from each network switching circuit to each other network switch, and thus any communication may be transmitted without traversing any intermediate network switching circuits. Any level of interconnectedness may be used in various embodiments.

In the descriptions of FIGS. 1-6, network interface circuits are described in relation to network switching circuits. Communication between network switching circuits and network interfaces may be implemented in a variety of fashions. An example of how a network switching circuit may exchange transactions with a network interface is shown in FIG. 11.

Figure 11:
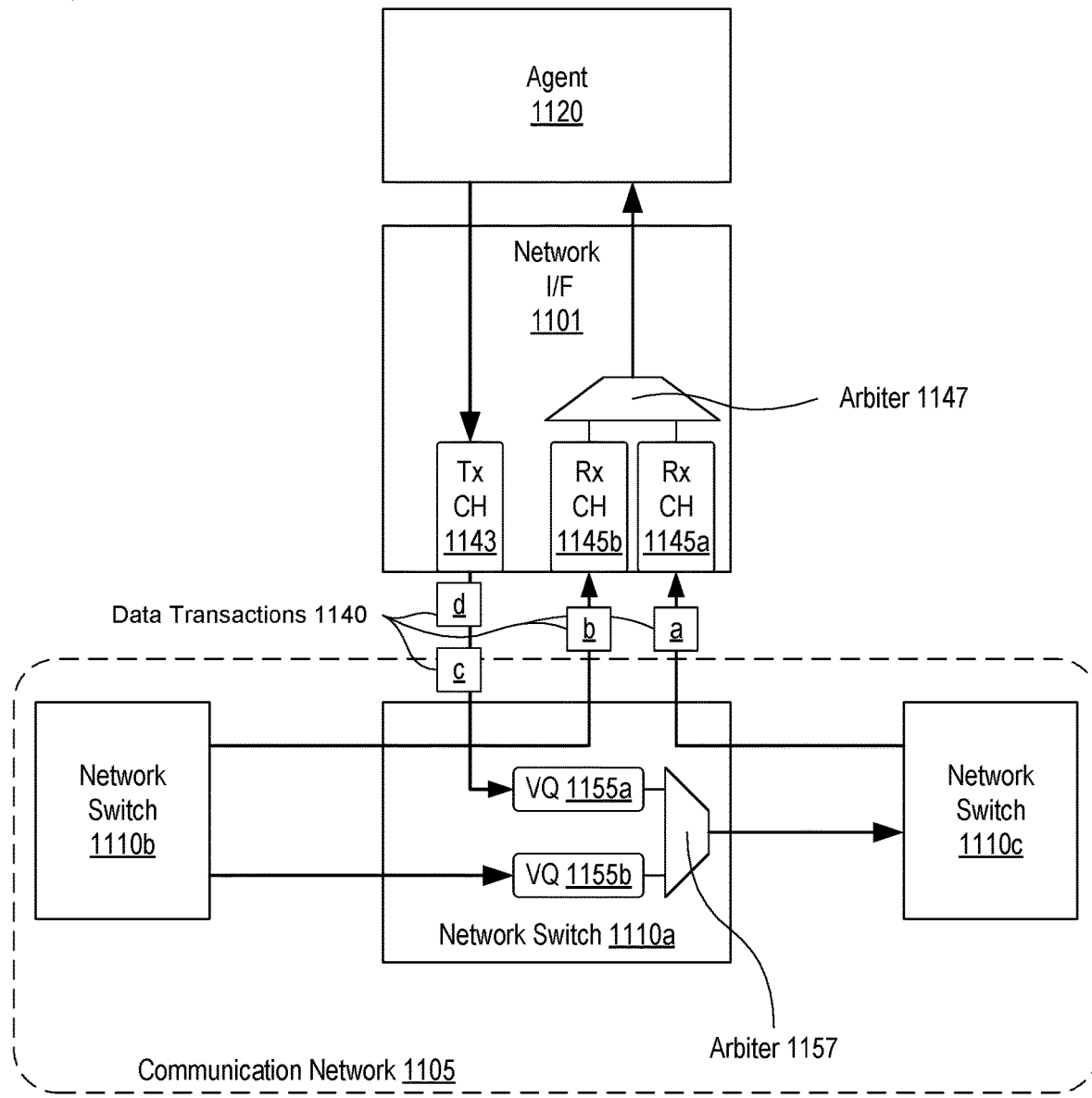
FIG. 11 illustrates a block diagram of an embodiment of a system that includes a network interface with asymmetrical input and output channels.

Moving now to FIG. 11, a block diagram of an embodiment of system with an agent circuit, a network interface and a network switch is shown. As illustrated, system 1100 includes agent circuit 1120 coupled to network interface (I/F) 1101 which, in turn, is coupled to network switching circuit 1110a. Network switching circuit 1110a is further coupled to network switching circuits 1110b and 1110c. Network switching circuits 1110a-1110c are included in communication network 1105. In some embodiments, agent circuit 1120, network interface 1101, and network switching circuits 1110a-1110c may correspond to similarly named and numbered elements shown in FIGS. 1-4.

As illustrated, agent circuit 1120 may be configured to transfer data transactions to and from communication network 1105 via network interface 1101. Communication network 1105, as disclosed, includes network switching circuits 1110a-1110c for transferring data transactions between agent circuit 1120 and other agent circuits coupled to other network switching circuits (not shown) in communication network 1105.

Network interface 1101, as shown, includes a plurality of input channels (Rx CH 1145a and 1145b) and one or more output channels (Tx CH 1143). Network interface 1101 may be configured to receive a first plurality of data transactions (data transactions 1140a and 1140b) from network switching circuit 1110a via Rx CH 1145a and 1145b. In some embodiments, network interface 1101 is further configured to receive data transactions 1140a and 1140b from network switching circuit 1110a concurrently. Network interface 1101 may be further configured to send a second plurality of data transactions (data transactions 1140c and 1140d) to network switching circuit 1110a via Tx CH 1143. As depicted, network interface 1101 may be further configured to send data transactions 1140c and 1140d to network switching circuit 1110a serially. To receive data transactions 1140a and 1140b (as well as subsequent data transactions) concurrently, network interface 1101 may, in some embodiments, include respective transaction buffers coupled to Rx CHs 1145a and 1145b. In addition, network interface 1101 may include arbitration circuit (arbiter) 1147 to select a data transaction from a given one of the transaction buffers. Arbitration circuit 1147 may use any suitable arbitration scheme to select between Rx CHs 1145a and 1145b, such as least recently used, round robin, credits, number of buffered transactions, and the like. In some embodiments, Tx CH 1143 may be coupled to a respective buffer circuit while, in other embodiments, agent circuit 1120 may send data transactions to Tx CH 1143 one at a time.

In some embodiments, agent circuit 1120 may be configured to receive data transactions 1140 at a first data rate. For example, agent circuit 1120 may be a graphics processing unit or a display capable of consuming data transactions at the first rate to support displaying frames of a video at a particular frame rate and resolution. In such embodiments, failure to receive the data transactions at the first data rate may result in the video playback stalling or glitching. To send data transactions 1140 to agent circuit 1120 at the first data rate, network switching circuit may be configured to enter a first performance state to serially send data transactions 1140 to agent circuit 1120 at the first data rate, and to enter a second performance state to concurrently send data transactions 1140 to agent circuit 1120 at the first data rate. For example, to serially transfer data transactions 1140 from network switching circuit 1110a to network interface 1101 at the first rate, communication network 1105 may operate in a performance mode that enables data transfers at the first data rate. Clock frequencies in such a performance mode must be high enough to support the serial data rate. Sending data transactions concurrently, however, may allow use of a slower frequency (e.g., one-half of the frequency of the first performance mode) since two data transactions may be transferred in parallel. Accordingly, the second performance state may use less power than the first performance state.

To avoid congestion at network switching circuit 1110a when agent circuit 1120 is sending data transactions 1140c and 1140d, network switching circuit 1110a may include virtual channel queue (VQ) 1155a that is configured to receive data transactions 1140c and 1140d from network interface 1101. Network switching circuit 1110a may further include virtual channel queue (VQ) 1155b that is configured to receive a different plurality of data transactions from another network switching circuit in communication network 1105 (e.g., network switching circuit 1110b). Accordingly, network switching circuit 1110a may be capable of receiving data transactions from network switching circuit 1110b and network interface 1101 concurrently, and placing them into virtual channel queues 1155b and 1155a, respectively. Arbitration circuit (arbiter) 1157 may be configured to use any suitable arbitration algorithm (such as those disclosed above) to select a data transaction from either of virtual channel queues 1155a or 1155b.

By using a first number of input channels that is greater than a second number of output channels, network interface may be capable of pulling data transactions out of communication network 1105 more quickly than if data transactions were received serially. This may relieve congestion in communication network 1105, particularly in network switching circuit 1110a, thereby increasing a bandwidth for transferring data transaction. In addition, if data traffic in communication network 1105 is not heavy, then communication network 1105 may be capable of running in a lower performance mode, thereby reducing power consumption while maintaining a desired data rate for transferring data transactions to agent circuit 1120.

It is noted that that system 1100 of FIG. 11, is merely an example. System 1100 has been simplified to show elements relevant to this demonstration. For example, a single agent circuit is shown coupled to the network interface. In other embodiments, a plurality of agent circuits may be coupled to a single network interface. Although one output channel and two input channels are shown for network interface 1101, in other embodiments, any suitable number of input and output channels may be included. A number of input channels, however, may be greater than a number of output channels.

To summarize, various embodiments are disclosed including an apparatus that may comprise one or more first agent circuits that are configured to transfer data transactions using an ordered protocol, as well as one or more second agent circuits that are configured to transfer data transactions using a protocol with no enforced ordering. This apparatus may also include one or more input/output (I/O) interfaces coupled to respective ones of the first agent circuits, and are configured to enforce the ordered protocol. Furthermore, the apparatus may include a communication network including a plurality of network switching circuits. A particular one of the plurality of network switching circuits may be coupled to at least one other network switching circuit of the plurality of network switching circuits. The apparatus may also include a network interface circuit, coupled the second agent circuits, to the I/O interfaces, and to the particular network switching circuit. This network interface circuit may be configured to transfer data transactions between the second agent circuits and the particular network switching circuit, and to transfer data transactions between the I/O interfaces and the particular network switching circuit.

In a further example, a particular first agent circuit may be configured to send data transactions to a respective I/O interface using a first protocol. A particular second agent circuit may be configured to send data transactions to the network interface circuit using a second protocol, different than the first protocol. In another example, the respective I/O interface is configured to send data transactions received from the particular first agent circuit to the network interface circuit using the second protocol.

In an example, a particular first agent circuit may be configured to send, in a first order, a series of data transactions to a respective I/O interface. The respective I/O interface may be configured to send the series of data transactions to the network interface circuit in the first order. The network interface circuit may be configured to send the series of data transactions to the communication network in a second order, different than the first order.

Another apparatus may comprise a particular integrated circuit including a plurality of agent circuits configured to initiate memory transactions. The particular integrated circuit may also include a plurality of memory circuits configured to respond to the memory transactions. A given memory circuit may be configured to process a given memory transaction based on an address accessed by the given memory transaction. The particular integrated circuit may further include a communication network, including one or more first network switching circuits coupled to a first portion of the plurality of agent circuits, and one or more second network switching circuits coupled to a second portion of the plurality of memory circuits. The communication network may be configured to transfer memory transactions via one of two communication lanes. A first communication lane may include a first proper subset of the first and second network switching circuits, and a second communication lane may include a second proper subset of the first and second network switching circuits. The first and second proper subsets may be mutually exclusive. At least one of the first network switching circuits in the first communication lane may be coupled to a respective one of the first network switching circuits in the second communication lane. The second network switching circuits in the first communication lane may be isolated from network switching circuits in the second communication lane.

In a further example, a plurality of the first network switching circuits in the first communication lane and a plurality of the first network switching circuits in the second communication lane may be coupled to form a mesh sub-network between the first and second communication lanes. In an example, a particular agent, coupled to a particular first network switching circuit in the first communication lane, may be configured to initiate a particular memory transaction for a particular memory circuit coupled to a particular second network switching circuit in the second communication lane.

In another example, the particular first network switching circuit may be configured to transmit the particular memory transaction to a different first network switching circuit in the second communication lane. The different first network switching circuit may be configured to transmit the particular memory transaction to the particular second network switching circuit in the second communication lane.

Another example of an apparatus may comprise an agent circuit configured to transfer data transactions, and a communication network including a plurality of network switching circuits. A particular one of the plurality of network switching circuits may be coupled to at least one other network switching circuit of the plurality of network switching circuits. The apparatus may also include a network interface circuit, coupled to the agent circuit and to the particular network switching circuit, and may include a plurality of input channels and one or more output channels. A first number of the input channels may be greater than a second number of the one or more output channels. The network interface circuit may be configured to receive a first plurality of data transactions from the particular network switching circuit via the plurality of input channels, and to send a second plurality of data transactions to the particular network switching circuit via the one or more output channels.

In a further example, the network interface circuit may be further configured to receive the first plurality of data transactions from the particular network switching circuit concurrently. In another example, the network interface circuit may be further configured to send the second plurality of data transactions to the particular network switching circuit serially.

In an example, the agent circuit may be configured to receive data transactions at a first data rate. To send data transactions to the agent circuit at the first data rate, the particular network switching circuit may be configured to enter a first performance state to serially send the data transactions to the agent circuit at the first data rate, and enter a second performance state to concurrently send the data transactions to the agent circuit at the first data rate. The second performance state may use less power than the first performance state.

The circuits and techniques described above in regards to FIG. 11 may be performed using a variety of methods. An example method associated with transferring transactions via a network interface is described below in regard to FIG. 12.

Proceeding now to FIG. 12, a flow diagram for an embodiment of a method for transferring data transactions to and from a network interface is illustrated. Method 1200 may be used in conjunction with any of the systems disclosed herein, for example, system 1100 in FIG. 11. Method 1200 is described below using system 1100 of FIG. 11 as an example. References to elements in FIG. 12 are included as non-limiting examples. As depicted, method 1200 may be performed concurrently with the previously described methods 500 and 600.

Method 1200 begins in 1210 with a network interface circuit receiving a first plurality of data transactions from the particular network switching circuit via a plurality of input channels. For example, network interface 1101 may receive data transactions 1140a and 1140b concurrently from network switching circuit 1110a, and may place received data transactions 1140a and 1140b into respective buffers coupled to each of Rx CHs 1145a and 1145b. Data transactions 1140a and 1140b may each be received at a first data rate per input channel.

At 1220, method 1200 proceeds with the network interface circuit sending the first plurality of data transactions to an agent circuit coupled to the network interface circuit using a second data rate that is higher than the first data rate. For example, arbitration circuit 1147 may be used to select either data transaction 1140a from Rx CH 1145a or data transaction 1140b from Rx CH 1145b. As described above, any suitable arbitration technique may be utilized. Arbitration circuit 1147 may then forward the selected data transaction to agent circuit 1120 at the second data rate, higher than the first data rate. Use of the lower data rate to transfer data transactions 1140 from network switching circuit 1110a to network interface 1101 may allow communication network 1105 to operate in a reduced power state while maintaining a desired data rate for providing data transactions to agent circuit 1120.

Method 1200 continues at 1230 with the network interface circuit receiving a second plurality of data transactions from the agent circuit using the second data rate. Agent circuit 1120, for example, may generate data transactions 1140c and 1140d to be sent to an agent circuit (not shown in FIG. 11) that is also coupled to communication network 1105. Agent circuit 1120 may send data transactions 1140c and 1140d to network interface 1101. In some embodiments, network interface 1101 may receive data transactions 1140a and 1140b one at a time. In other embodiments, Tx CH 1143 may include, or be coupled to, a buffer that allows multiple data transactions to be received and queued for sending.

At 1240, method 1200 may continue with the network interface circuit sending the second plurality of data transactions to the particular network switching circuit via one or more output channels. For example, network interface 1101 sends data transactions 1140a and 1140b to network switching circuit 1110a via Tx CH 1143. Since network interface 1101, as shown, has a single output channel (Tx CH 1143), data transactions 1140a and 1140b are sent serially. As is illustrated in FIG. 11, a first number of the input channels (Rx CH 1145) is greater than a second number of the one or more output channels (Tx CH 1143). In some embodiments, agent circuit 1120 may not generate as many data transactions as it receives. If, for example, agent circuit 1120 is a display, then agent circuit 1120 may receive many large data transactions corresponding to a frame of image data to display, while sending modest amounts of data transactions to, for example, reply to status requests, and/or indicate too much or too little image data is being received. By including additional input channels, data transactions may be off-loaded from communication network 1105 more rapidly, thereby freeing bandwidth within communication network 1105. Since agent circuit 1120 may not generate as many data transactions as it consumes, additional output channels may not be implemented in some embodiments.

It is noted that method 1200 includes blocks 1210-1240. Method 1200 may end in block 1240 or may repeat some or all blocks of the method. For example, method 1200 may repeat operations 1210 and 1220 to receive a large number of data transactions. Method 1200 may be performed concurrently with methods 500 and 600. Method 1200 may also be performed concurrently with another instance of method 1200. For example, a network interface circuit may be coupled to a plurality of agent circuits and have a plurality of input channels for two or more of these agent circuits.

Figure 13:
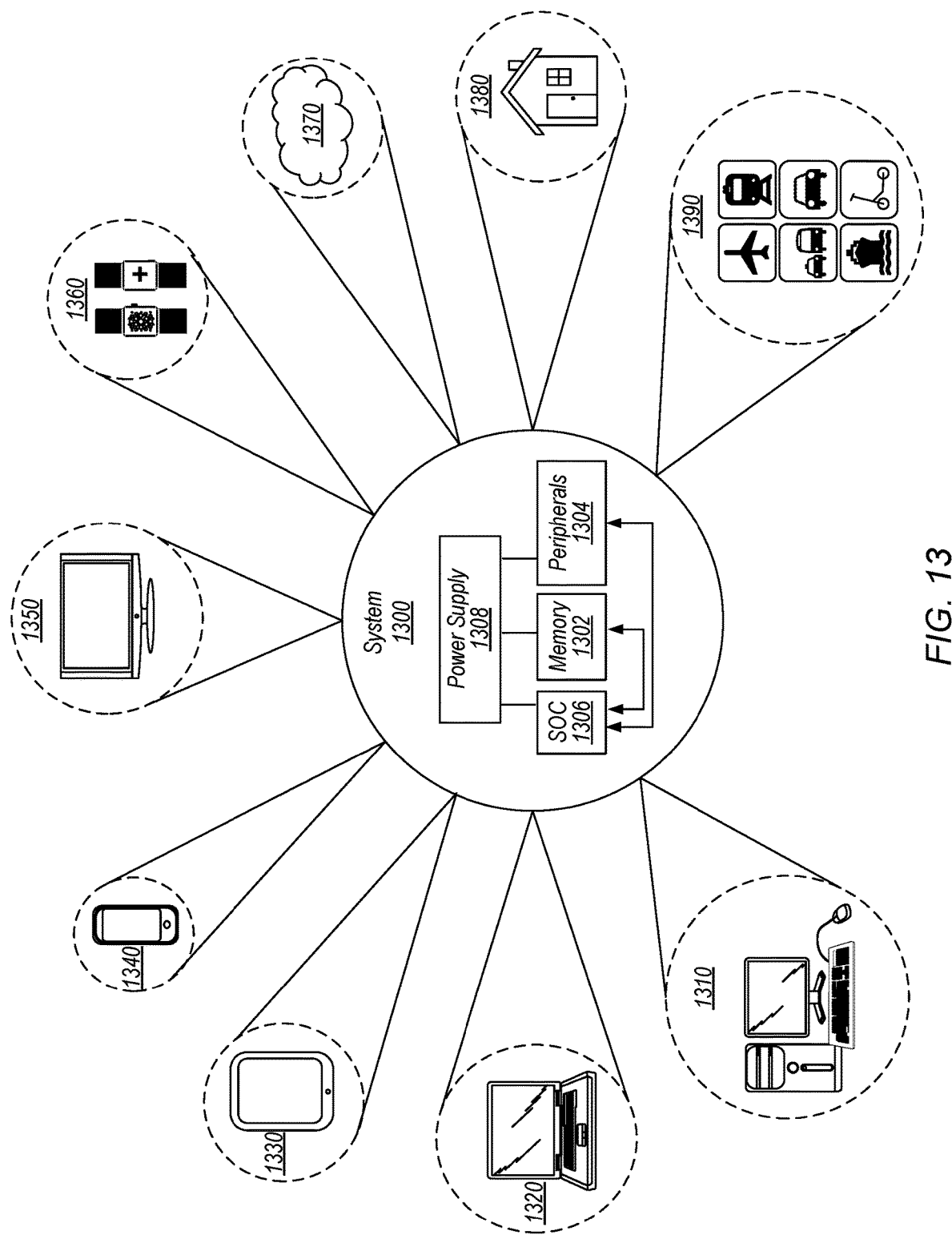
FIG. 13 depicts various embodiments of systems that include integrated circuits that utilize the disclosed techniques.

FIGS. 1-12 illustrate circuits and methods for a system, such as an integrated circuit, that include a variety of network interfaces and I/O interfaces for transferring transactions between agent circuits in a communication network. Any embodiment of the disclosed systems may be included in one or more of a variety of computer systems, such as a desktop computer, laptop computer, smartphone, tablet, wearable device, and the like. In some embodiments, the circuits described above may be implemented on a system-on-chip (SoC) or other type of integrated circuit, including multi-die packages. A block diagram illustrating an embodiment of system 1300 is illustrated in FIG. 13. System 1300 may, in some embodiments, include any disclosed embodiment of systems disclosed herein, such as systems 100, 400, 700, 800, and 1100 shown in various ones of FIGS. 1-11.

In the illustrated embodiment, the system 1300 includes at least one instance of a system on chip (SoC) 1306 which may include multiple types of processor circuits, such as a central processing unit (CPU), a graphics processing unit (GPU), or otherwise, a communication fabric, and interfaces to memories and input/output devices. SoC 1306 may correspond to an instance of the SoCs disclosed herein. In various embodiments, SoC 1306 is coupled to external memory circuit 1302, peripherals 1304, and power supply 1308.

A power supply 1308 is also provided which supplies the supply voltages to SoC 1306 as well as one or more supply voltages to external memory circuit 1302 and/or the peripherals 1304. In various embodiments, power supply 1308 represents a battery (e.g., a rechargeable battery in a smart phone, laptop or tablet computer, or other device). In some embodiments, more than one instance of SoC 1306 is included (and more than one external memory circuit 1302 is included as well).

External memory circuit 1302 is any type of memory, such as dynamic random-access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. In some embodiments, external memory circuit 1302 may include non-volatile memory such as flash memory, ferroelectric random-access memory (FRAM), or magnetoresistive RAM (MRAM). One or more memory devices may be coupled onto a circuit board to form memory modules such as single inline memory modules (SIMMs), dual inline memory modules (DIMMs), etc. Alternatively, the devices may be mounted with a SoC or an integrated circuit in a chip-on-chip configuration, a package-on-package configuration, or a multi-chip module configuration.

The peripherals 1304 include any desired circuitry, depending on the type of system 1300. For example, in one embodiment, peripherals 1304 includes devices for various types of wireless communication, such as Wi-Fi, Bluetooth, cellular, global positioning system, etc. In some embodiments, the peripherals 1304 also include additional storage, including RAM storage, solid state storage, or disk storage. The peripherals 1304 include user interface devices such as a display screen, including touch display screens or multi-touch display screens, keyboard or other input devices, microphones, speakers, etc.

As illustrated, system 1300 is shown to have application in a wide range of areas. For example, system 1300 may be utilized as part of the chips, circuitry, components, etc., of a desktop computer 1310, laptop computer 1320, tablet computer 1330, cellular or mobile phone 1340, or television 1350 (or set-top box coupled to a television). Also illustrated is a smartwatch and health monitoring device 1360. In some embodiments, the smartwatch may include a variety of general-purpose computing related functions. For example, the smartwatch may provide access to email, cellphone service, a user calendar, and so on. In various embodiments, a health monitoring device may be a dedicated medical device or otherwise include dedicated health related functionality. In various embodiments, the above-mentioned smartwatch may or may not include some or any health monitoring related functions. Other wearable devices 1360 are contemplated as well, such as devices worn around the neck, devices attached to hats or other headgear, devices that are implantable in the human body, eyeglasses designed to provide an augmented and/or virtual reality experience, and so on.

System 1300 may further be used as part of a cloud-based service(s) 1370. For example, the previously mentioned devices, and/or other devices, may access computing resources in the cloud (i.e., remotely located hardware and/or software resources). Still further, system 1300 may be utilized in one or more devices of a home 1380 other than those previously mentioned. For example, appliances within the home may monitor and detect conditions that warrant attention. Various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 13 is the application of system 1300 to various modes of transportation 1390. For example, system 1300 may be used in the control and/or entertainment systems of aircraft, trains, buses, cars for hire, private automobiles, waterborne vessels from private boats to cruise liners, scooters (for rent or owned), and so on. In various cases, system 1300 may be used to provide automated guidance (e.g., self-driving vehicles), general systems control, and otherwise.

It is noted that the wide variety of potential applications for system 1300 may include a variety of performance, cost, and power consumption requirements. Accordingly, a scalable solution enabling use of one or more integrated circuits to provide a suitable combination of performance, cost, and power consumption may be beneficial. These and many other embodiments are possible and are contemplated. It is noted that the devices and applications illustrated in FIG. 13 are illustrative only and are not intended to be limiting. Other devices are possible and are contemplated.

As disclosed in regards to FIG. 13, system 1300 may include one or more integrated circuits included within a personal computer, smart phone, tablet computer, or other type of computing device. A process for designing and producing an integrated circuit using design information is presented below in FIG. 14.

Figure 14:
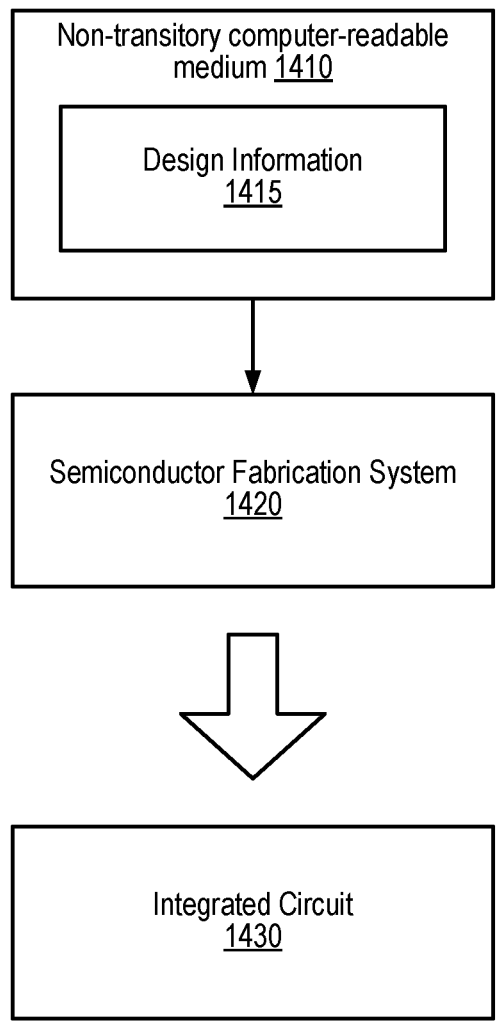
FIG. 14 is a block diagram of an example computer-readable medium, according to some embodiments.

FIG. 14 is a block diagram illustrating an example of a non-transitory computer-readable storage medium that stores circuit design information, according to some embodiments. The embodiment of FIG. 14 may be utilized in a process to design and manufacture integrated circuits, for example, including one or more instances of systems (or portions thereof) 100, 400, 700, 800, and 1100 that are disclosed above. In the illustrated embodiment, semiconductor fabrication system 1420 is configured to process the design information 1415 stored on non-transitory computer-readable storage medium 1410 and fabricate integrated circuit 1430 based on the design information 1415.

Non-transitory computer-readable storage medium 1410, may comprise any of various appropriate types of memory devices or storage devices. Non-transitory computer-readable storage medium 1410 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1410 may include other types of non-transitory memory as well or combinations thereof. Non-transitory computer-readable storage medium 1410 may include two or more memory mediums which may reside in different locations, e.g., in different computer systems that are connected over a network.

Design information 1415 may be specified using any of various appropriate computer languages, including hardware description languages such as, without limitation: VHDL, Verilog, SystemC, SystemVerilog, RHDL, M, MyHDL, etc. Design information 1415 may be usable by semiconductor fabrication system 1420 to fabricate at least a portion of integrated circuit 1430. The format of design information 1415 may be recognized by at least one semiconductor fabrication system, such as semiconductor fabrication system 1420, for example. In some embodiments, design information 1415 may include a netlist that specifies elements of a cell library, as well as their connectivity. One or more cell libraries used during logic synthesis of circuits included in integrated circuit 1430 may also be included in design information 1415. Such cell libraries may include information indicative of device or transistor level netlists, mask design data, characterization data, and the like, of cells included in the cell library.

Integrated circuit 1430 may, in various embodiments, include one or more custom macrocells, such as memories, analog or mixed-signal circuits, and the like. In such cases, design information 1415 may include information related to included macrocells. Such information may include, without limitation, schematics capture database, mask design data, behavioral models, and device or transistor level netlists. As used herein, mask design data may be formatted according to graphic data system (gdsii), or any other suitable format.

Semiconductor fabrication system 1420 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1420 may also be configured to perform various testing of fabricated circuits for correct operation.

In various embodiments, integrated circuit 1430 is configured to operate according to a circuit design specified by design information 1415, which may include performing any of the functionality described herein. For example, integrated circuit 1430 may include any of various elements shown or described herein. Further, integrated circuit 1430 may be configured to perform various functions described herein in conjunction with other components.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]-is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112 (f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus comprising:
   a plurality of agent circuits including:
      one or more first agent circuits configured to transfer data transactions using an ordered protocol;
      one or more second agent circuits configured to transfer data transactions using a protocol with no enforced ordering;
   one or more input/output (I/O) interfaces coupled to respective ones of the first agent circuits, and configured to enforce the ordered protocol;
   a communication network including a plurality of network switching circuits, wherein a particular one of the plurality of network switching circuits is coupled to at least one other network switching circuit of the plurality of network switching circuits; and
   a network interface circuit, coupled to the second agent circuits, to the I/O interfaces, and to the particular network switching circuit, and configured to:
      transfer data transactions between the second agent circuits and the particular network switching circuit; and
      transfer data transactions between the I/O interfaces and the particular network switching circuit.

2. The apparatus of claim 1, wherein a particular first agent circuit is configured to send data transactions to a respective I/O interface using a first protocol; and wherein a particular second agent circuit is configured to send data transactions to the network interface circuit using a second protocol, different than the first protocol.

3. The apparatus of claim 2, wherein the respective I/O interface is configured to send data transactions received from the particular first agent circuit to the network interface circuit using the second protocol.

4. The apparatus of claim 1, wherein a particular first agent circuit is configured to send, in a first order, a series of data transactions to a respective I/O interface;
wherein the respective I/O interface is configured to send the series of data transactions to the network interface circuit in the first order; and
wherein the network interface circuit is configured to send the series of data transactions to the communication network in a second order, different than the first order.

5. The apparatus of claim 4, wherein the network interface circuit is configured to send responses to the series of data transactions to the respective I/O interface in a third order, corresponding to an order the responses are received from the communication network; and
wherein the respective I/O interface is configured to send the responses to the series of data transactions to the particular first agent circuit in the first order.

6. The apparatus of claim 5, wherein to send the responses to the series of data transactions to the particular first agent circuit in the first order, the respective I/O interface is configured to buffer ones of the responses received from the network interface circuit in the third order.

7. The apparatus of claim 1, further comprising:
one or more third agent circuits configured to transfer data transactions using the ordered protocol;
one or more additional I/O interfaces coupled to respective ones of the third agent circuits, and configured to enforce the ordered protocol; and
a different network interface circuit, coupled to the additional I/O interfaces, and to a different one of the plurality of network switching circuits.

8. The apparatus of claim 1, further comprising:
a plurality of memory circuits; and
a first communication lane and a second communication lane;
wherein the plurality of network switching circuits include one or more first network switching circuits coupled to respective ones of a first portion of the plurality of agent circuits, and one or more second network switching circuits coupled to respective ones of the plurality of memory circuits;
wherein the first communication lane includes a first proper subset of the first and second network switching circuits; and
wherein a second communication lane includes a second proper subset of the first and second network switching circuits, wherein the first and second proper subsets are mutually exclusive.

9. The apparatus of claim 8, wherein at least one of the first network switching circuits in the first communication lane is coupled to a respective one of the first network switching circuits in the second communication lane; and
wherein the second network switching circuits in the first communication lane are isolated from network switching circuits in the second communication lane.

10. The apparatus of claim 1, wherein the network interface circuit includes a plurality of input channels and one or more output channels, wherein a first number of the input channels is greater than a second number of the one or more output channels, and wherein the network interface circuit is further configured to:
receive a first plurality of data transactions from the particular network switching circuit via the plurality of input channels; and
send a second plurality of data transactions to the particular network switching circuit via the one or more output channels.

11. A method comprising:
transferring, by a first agent circuit to an input/output (I/O) interface circuit, a first group of data transactions using an ordered protocol;
transferring, by a second agent circuit to a network interface circuit, a second group of data transactions using an unforced-order protocol;
transferring, by the I/O interface circuit to the network interface circuit, the first group of data transactions using the ordered protocol; and
transferring, by the network interface circuit to a communication fabric, the first and second groups of data transactions using an order based on respective destination availability.

12. The method of claim 11, further comprising receiving, by the network interface circuit from the communication fabric, responses to the first and second groups of data transactions in a received order that is based on respective destination response times.

13. The method of claim 12, further comprising:
transferring, by the network interface circuit to the I/O interface circuit, the responses to the first group of data transactions based on the received order; and
transferring, by the network interface circuit to the second agent circuit, the responses to the second group of data transactions based on the received order.

14. The method of claim 13, further comprising transferring, by the I/O interface circuit to the first agent circuit, the responses to the first group of data transactions using the ordered protocol.

15. The method of claim 11, further comprising:
receiving, by the network interface circuit, a third group of data transactions from the communication fabric via a plurality of input channels, wherein the data transactions are received at a first data rate per input channel;
sending, by the network interface circuit, the third group of data transactions to a particular agent circuit using a second data rate that is higher than the first data rate;
receiving, by the network interface circuit, a fourth group of data transactions from the particular agent circuit using the second data rate; and
sending, by the network interface circuit, the fourth group of data transactions to the communication fabric via one or more output channels, wherein a first number of the input channels is greater than a second number of the one or more output channels.

16. A system comprising:
a plurality of agent circuits, including:
a first agent circuit configured to send, in a first order, a first group of data transactions using an ordered protocol;
a second agent circuit configured to send a second group of data transactions using a protocol with no enforced ordering;
an input/output (I/O) interface coupled to the first agent circuit, and configured to:
receive the first group of data transactions in the first order; and send the first group of data transactions using the first order;
a communication network including a plurality of network switching circuits; and
a network interface circuit and configured to:
receive, from the I/O interface, the first group of data transactions in the first order;
send, to a particular network switching circuit of the plurality of network switching circuits, the first group of data transactions with no enforced ordering;
receive, from the second agent circuit, the second group of data transactions; and
send the second group of data transactions to the particular network switching circuit with no enforced ordering.

17. The system of claim 16, further comprising a plurality of memory circuits coupled to a first portion of the plurality of network switching circuits, and wherein a portion of the plurality of agent circuits is coupled to a second portion of the plurality of network switching circuits; and
wherein the communications network includes:
a first communication lane that includes a first proper subset of the first and second portions of network switching circuits; and
a second communication lane that includes a second proper subset of the first and second portions of network switching circuits, wherein the first and second proper subsets are mutually exclusive.

18. The system of claim 17, wherein at least one of the second portion of network switching circuits in the first communication lane is coupled to a respective one of the second portion of network switching circuits in the second communication lane; and
wherein the first portion of network switching circuits in the first communication lane are isolated from the first and second portions of network switching circuits in the second communication lane.

19. The system of claim 16, wherein the network interface circuit is configured to:
receive, from the particular network switching circuit, responses to the first and second groups of data transactions in a received order that is based on respective destination response times; and
send, to the I/O interface, the responses to the first group of data transactions based on the received order; and
send, to the second agent circuit, the responses to the second group of data transactions based on the received order.

20. The system of claim 19, wherein the I/O interface is further configured to:
receive, from the network interface circuit, the responses to the first group of data transactions in an order that is based on the received order; and
send, to the first agent circuit, the responses to the first group of data transactions in the first order.

\* \* \* \* \*